United States Patent

Yamamoto et al.

(10) Patent No.: US 9,014,893 B2
(45) Date of Patent: Apr. 21, 2015

(54) PLUG-IN HYBRID VEHICLE

(71) Applicants: Masaya Yamamoto, Kasugai (JP); Mikihisa Arai, Toyota (JP)

(72) Inventors: Masaya Yamamoto, Kasugai (JP); Mikihisa Arai, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 204 days.

(21) Appl. No.: 13/721,634

(22) Filed: Dec. 20, 2012

(65) Prior Publication Data

US 2013/0166125 A1    Jun. 27, 2013

(30) Foreign Application Priority Data

Dec. 21, 2011    (JP) .................................. 2011-280039

(51) Int. Cl.

| G06F 17/00 | (2006.01) |
| G06F 19/00 | (2011.01) |
| B60W 10/06 | (2006.01) |
| B60W 10/08 | (2006.01) |
| B60W 20/00 | (2006.01) |

(52) U.S. Cl.
CPC ............... B60W 20/20 (2013.01); B60W 10/06 (2013.01); B60W 10/08 (2013.01); B60W 20/106 (2013.01); B60W 2600/00 (2013.01); Y10S 903/93 (2013.01)

(58) Field of Classification Search
USPC ............. 701/1, 22, 36, 70, 99, 101, 123, 400, 701/408, 409; 180/65.21, 65.265, 65.275, 180/65.29
See application file for complete search history.

(56) References Cited

U.S. PATENT DOCUMENTS

| 6,173,574 | B1 * | 1/2001 | Obayashi et al. ................ 60/710 |
| 2009/0288896 | A1 * | 11/2009 | Ichikawa .................. 180/65.265 |
| 2010/0049389 | A1 * | 2/2010 | Ando .............................. 701/22 |

FOREIGN PATENT DOCUMENTS

| CN | 101616828 A | 12/2009 |
| JP | 2009-290940 A | 12/2009 |
| JP | 2011-51395 A | 3/2011 |
| JP | 2011-225097 A | 11/2011 |
| JP | 2013-139195 A | 7/2013 |
| JP | 2013-147206 A | 8/2013 |
| JP | 2013-162618 A | 8/2013 |

* cited by examiner

*Primary Examiner* — Thomas Tarcza
*Assistant Examiner* — Edward Pipala
(74) *Attorney, Agent, or Firm* — Kenyon & Kenyon LLP

(57) ABSTRACT

A plug-in hybrid vehicle includes: an internal combustion engine outputting driving power; an electric motor outputting driving power; an electrical storage device storing electric power; and a controller. The controller is configured to learn an electric power consumption rate by calculating the electric power consumption rate when the vehicle has traveled on the electric power stored in the electrical storage device using only the electric motor as a driving force source and to control travel of the vehicle using at least one of the internal combustion engine and the electric motor as the driving force source. The controller is configured to, when a driving frequency of the internal combustion engine that is driven as the vehicle travels on at least one of an uphill and a downhill is higher than a predetermined frequency, invalidate the calculated electric power consumption rate or information acquired to calculate the electric power consumption rate.

9 Claims, 11 Drawing Sheets

PLUG-IN HYBRID VEHICLE

INCORPORATION BY REFERENCE

The disclosure of Japanese Patent Application No. 2011-280039 filed on Dec. 21, 2011 including the specification, drawings and abstract is incorporated herein by reference in its entirety.

BACKGROUND OF THE INVENTION

1. Field of the Invention

The invention relates to a plug-in hybrid vehicle that is able to charge a drive electrical storage device (hereinafter, referred to as "driving battery" or simply referred to as "battery" where appropriate) from an external power supply. Particularly, the invention relates to improvement in a method of calculating an electric power consumption rate. Note that "one trip" in the specification means a period from charging (plug-in charging) of the driving battery from the external power supply is completed and then the vehicle starts travelling to when the next plug-in charging is started.

2. Description of Related Art

In recent years, in terms of environmental protection, it is desired to reduce the amount of emission of exhaust gas from an internal combustion engine (hereinafter, referred to as "engine" where appropriate) mounted on a vehicle and to improve a fuel consumption rate (fuel economy). As a vehicle that satisfies these requirements, a hybrid vehicle equipped with a hybrid system has been practically used. The hybrid vehicle includes an engine, such as a gasoline engine and a diesel engine, and a driving motor (for example, formed of a motor generator or a motor) that is driven by electric power generated by the power of the engine or electric power stored in the driving battery. The hybrid vehicle travels by utilizing one or both of these engine and driving motor as a driving force source.

In recent years, a hybrid vehicle that is able to charge a driving battery, which supplies electric power to a driving motor, with electric power from a power supply outside the vehicle (external power supply), such as a domestic power supply (so-called plug-in hybrid vehicle) has been developed.

The plug-in hybrid vehicle is designed on the assumption that the vehicle travels preferentially on electric power from the driving battery in order to significantly improve a fuel consumption rate. For example, as is described in Japanese Patent Application Publication No. 2011-51395 (JP 2011-51395 A) and Japanese Patent Application Publication No. 2011-225097 (JP 2011-225097 A), a drive mode of a plug-in hybrid vehicle is set to a mode (generally, called "charge depleting (CD) mode" or "electric vehicle (EV) mode") in which the vehicle travels preferentially on only the power of a driving motor until the state of charge of the driving battery decreases to a predetermined value, and is changed to a mode (generally, called "charge sustain (CS) mode" or "hybrid vehicle (HV) mode") in which the vehicle travels preferentially on both the power of an engine and the power of the driving motor when the state of charge of the driving battery is lower than the predetermined value.

In addition, in the plug-in hybrid vehicle, when the vehicle travels on only the power of the driving motor in the CD mode, a distance-to-empty is calculated for the current state of charge (remaining state of charge) of the driving battery, and information about the current state of charge is indicated on a meter panel (instrument panel). More specifically, an electric power consumption rate is calculated (an electric power consumption rate is learned) from a previous driving condition (relationship between an electric power consumption and a travel distance). The electric power consumption rate is a travel distance per unit amount of electric power. A distance-to-empty is calculated by multiplying the electric power consumption rate by the state of charge (the amount of electric power that is usable until the state of charge reaches the predetermined value at which the drive mode is changed to the CS mode) of the driving battery.

In addition, Japanese Patent Application Publication No. 2009-290940 (JP 2009-290940 A) describes a method of calculating an electric power consumption rate, in which an electric power consumption rate is calculated on the basis of a power of a driving force transmission system at the time when a vehicle travels a specified road section.

In the case where an electric power consumption rate is calculated as described above, when an engine is driven, it is required to calculate the work of the engine and the amount of charge in the case where part of the power of the engine is utilized for power generation in a motor generator and then a battery is charged, so calculation of an electric power consumption rate may be complicated or may not have sufficient accuracy. Therefore, calculation of an electric power consumption rate (including the case where only information for calculating an electric power consumption rate (an electric power consumption and a travel distance) is acquired) is desirably performed on the basis of an electric power consumption in the case where the vehicle is travelling while the engine is stopped and a travel distance obtained from the consumed electric power.

However, the inventors of the present application found that, when an electric power consumption rate is calculated from only information (an electric power consumption and a travel distance) at the time when the engine is stopped in this way, there may be an inconvenience that will be described below.

Hereinafter, the inconvenience will be specifically described with reference to FIG. 11. FIG. 11 shows a gradient of a road surface and a variation in electric power consumption rate (value in the case where it is assumed that an electric power consumption rate is calculated at each timing; an electric power consumption rate gets better toward an upper side and gets worse toward a lower side) during a vehicle travel in the case where a plug-in hybrid vehicle HV travels on an uphill and then travels on a downhill. The electric power consumption rate is a value obtained by dividing a travel distance from a start of travel (start of trip) by an electric power consumption. The solid line in the drawing indicates a proper electric power consumption rate that should be originally obtained as a variation in electric power consumption rate.

For example, when the plug-in hybrid vehicle HV utilizes both the power of the motor and the power of the engine at the time of travelling on the uphill, the engine is driven in that period (t1 in the drawing), so information for calculating an electric power consumption rate (information about an electric power consumption and a travel distance) is not acquired. That is, the electric power consumption rate in the period t1 is constant (remains unchanged) as indicated by the alternate long and short dash line in the drawing. However, in this period t1, actually, the vehicle travels on the uphill and, therefore, the electric power consumption per unit travel distance is relatively large. If an electric power consumption rate is calculated by acquiring information about an electric power consumption and a travel distance, the electric power consumption rate becomes relatively bad (intrinsically, in the period t1, a variation in electric power consumption rate becomes the one indicated by the solid line). On the other hand, when the vehicle travels on the uphill and then travels on the downhill, the engine is stopped because of a low required driving force, the vehicle travels almost without using the power of the motor, and the driving battery is charged through regenerative operation of the motor generator. In this period (t2 in the drawing), information for calculating an electric power consumption rate (an electric power consumption and a travel distance) is acquired as the engine is stopped, so an electric power consumption per unit travel distance in this period is relatively small, and the electric power consumption rate is calculated to be relatively good. In this period t2, as indicated by the alternate long and short dash line in the drawing, the electric power consumption rate gets better as the vehicle travels; however, the electric power consumption rate contains an error (D1 in the drawing) of the electric power consumption rate at the time when the vehicle is travelling on the uphill, so a finally obtained electric power consumption rate includes a deviation D1 toward a side at which the electric power consumption rate gets better with respect to an intrinsically calculated value, and it may be not possible to accurately obtain a distance-to-empty (a distance that can be traveled for a current state of charge of the driving battery) (it may cause an error to extend the distance-to-empty). The error is due to the fact that the potential energy of the vehicle of which the level is raised by the power of the engine at the time of travelling on the uphill is used at the time of travelling on the downhill.

On the other hand, when the plug-in hybrid vehicle HV uses only the power of the motor at the time of travelling on the uphill, the engine is stopped in the period t1, so information for calculating an electric power consumption rate (information about an electric power consumption and a travel distance) is acquired. Therefore, the electric power consumption rate in this period t1 is accurately calculated (coincides with the solid line in the drawing). On the other hand, after the vehicle travels on the uphill, when the engine is driven at the time when the vehicle travels on the downhill, information for calculating an electric power consumption rate (information about an electric power consumption and a travel distance) is not acquired in the period t2. That is, the electric power consumption rate in this period t2 is constant (remains unchanged) as indicated by the alternate long and two short dashes line in the drawing. However, in this period t2, actually, the vehicle travels on the downhill and, therefore, the electric power consumption per unit travel distance is relatively small. If an electric power consumption rate is calculated by acquiring information about an electric power consumption and a travel distance, the electric power consumption rate becomes relatively good (intrinsically, in the period t2, a variation in electric power consumption rate becomes the one indicated by the solid line). Therefore, a finally obtained electric power consumption rate includes a deviation D2 toward a side at which the electric power consumption rate gets worse with respect to an intrinsically calculated value, and, in this case as well, it may be not possible to accurately obtain a distance-to-empty (a distance that can be traveled for a current state of charge of the driving battery) (it may cause an error to reduce the distance-to-empty). Note that a situation in which the engine is driven at the time when the vehicle HV travels on a downhill may be, for example, a situation that, when input limit of the driving battery is reached (Win limitation) as a result of charging of the driving battery through regenerative operation of the motor generator, the engine is subjected to motoring (the engine is rotated by the electric motor) and electric power is consumed by the electric motor (discharged from the battery).

SUMMARY OF THE INVENTION

The invention provides a plug-in hybrid vehicle that is able to improve the accuracy of calculating an electric power consumption rate.

A solution principle of the invention is that, in learning of an electric power consumption rate of a plug-in hybrid vehicle, it is determined that a learned electric power consumption rate may have an error in the case where a driving time of an internal combustion engine is relatively long due to the fact that information for learning an electric power consumption rate is not acquired at the time when the internal combustion engine is driven, and, when the driving time of the internal combustion engine is relatively long, information for learning an electric power consumption rate in that trip is invalidated.

Specifically, an aspect of the invention provides a plug-in hybrid vehicle that includes: an internal combustion engine that outputs driving power; an electric motor that outputs driving power; an electrical storage device that stores electric power; and a controller that is configured to learn an electric power consumption rate by calculating the electric power consumption rate in the case where the vehicle has traveled on the electric power stored in the electrical storage device with the use of only the electric motor as a driving force source and to control travel of the plug-in hybrid vehicle with the use of at least one of the internal combustion engine and the electric motor as the driving force source, the controller being configured to, when a driving frequency of the internal combustion engine that is driven as the vehicle travels on at least one of an uphill and a downhill is higher than a predetermined frequency, invalidate the calculated electric power consumption rate or information acquired to calculate the electric power consumption rate.

Here, determination as to whether the plug-in hybrid vehicle is travelling on the uphill or the downhill may be made as follows. That is, it may be determined on the basis of whether there is any one of a power requirement, a torque requirement and a limit requirement of the plug-in hybrid vehicle, in response to which the internal combustion engine is operated in order to satisfy a driving request of the plug-in hybrid vehicle, the limit requirement being based on a maximum allowable electric power at or below which charging of the electrical storage device is allowed.

The "case where the vehicle has traveled with the use of only the electric motor as a driving force source" is the case where the vehicle travels on only power of the electric motor (driving motor) in the CD mode. Both the case where the vehicle travels on only power of the electric motor in the CD mode and the case where the vehicle travels on only power of the electric motor in the CS mode are included in the scope of the technical idea of the invention. Furthermore, simply, in a vehicle that is able to change between a drive mode in which the vehicle travels with the use of only the electric motor as the driving force source and a drive mode in which the vehicle travels with the use of both the electric motor and the internal combustion engine as the driving force source on the basis of a required driving force, and the like, the former drive mode is included in the scope of the technical idea of the invention.

With the above configuration, when the internal combustion engine is driven in the case where the plug-in hybrid vehicle travels on an uphill or a downhill, an error may be included in a calculated electric power consumption rate. For example, this is the case where, while the internal combustion engine is being driven, information for calculating an electric power consumption rate is not acquired. That is, when the internal combustion engine is driven while travelling on an uphill and information for calculating an electric power consumption rate is not acquired, an electric power consumption rate that is better than a proper value may be obtained as a calculated electric power consumption rate. On the other hand, when the internal combustion engine is driven while travelling on a downhill and information for calculating an electric power consumption rate is not acquired, an electric power consumption rate that is worse than a proper value may be obtained as a calculated electric power consumption rate. These errors increase with an increase in the driving frequency in the case where the internal combustion engine is driven due to the fact that the vehicle travels on an uphill or a downhill. Therefore, in this solution, when the driving frequency in the case where the internal combustion engine is driven as the vehicle travels on at least one of an uphill and a downhill is higher than the predetermined frequency, the calculated electric power consumption rate or information acquired to calculate the electric power consumption rate is invalidated. By so doing, a calculated electric power consumption rate that includes an error is not incorporated into learning of an electric power consumption rate. Thus, it is possible to maintain the high accuracy of a learned value of an electric power consumption rate.

An example configuration of learning operation of the electric power consumption rate may be as follows. That is, the electrical storage device is chargeable from an external power supply, and the electric power consumption rate is learned by incorporating an electric power consumption rate calculated on the basis of an electric power consumption and a travel distance in a period during which the vehicle has traveled with the use of only the electric motor as the driving force source in a period from when the electrical storage device has been charged from the external power supply and then the vehicle has traveled to when the electrical storage device is charged from the external power supply next time.

That is, an electric power consumption rate (trip electric power consumption rate) is calculated for a period from completion of charging of the electrical storage device from the external power supply to the next start of charging of the electrical storage device from the external power supply, and the calculated value is incorporated into a learned value. By so doing, it is possible to determine whether it is possible to properly obtain the calculated electric power consumption rate (whether to invalidate the calculated electric power consumption rate or whether to invalidate the information acquired to calculate the electric power consumption rate) for a relatively long period (one-trip period), so it is possible to increase the reliability.

An example usage mode of the learned electric power consumption rate obtained as described above may be as follows. That is, a distance-to-empty is calculated in the case where the vehicle travels with the use of only the electric motor as the driving force source by multiplying the learned electric power consumption rate by a remaining state of charge of the electrical storage device.

For example, when the thus calculated distance-to-empty is provided to a driver of the vehicle, it is possible to effectively utilize the learned electric power consumption rate.

The driving frequency in the case where the internal combustion engine is driven may be as follows. The driving frequency is set as an accumulated driving time of the internal combustion engine, and, when the accumulated driving time of the internal combustion engine is longer than a predetermined accumulated period of time, the calculated electric power consumption rate or the information acquired to calculate the electric power consumption rate is invalidated.

In addition, the driving frequency may be set as a rate of an accumulated driving time of the internal combustion engine with respect to a total travel time in one trip (for example, as described above, the period from when the electrical storage device has been charged from the external power supply and then the vehicle has traveled to when the electrical storage device is charged from the external power supply next time), and, when the rate of the accumulated driving time of the internal combustion engine is higher than a predetermined rate, the calculated electric power consumption rate or the information acquired to calculate the electric power consumption rate may be invalidated.

Furthermore, the driving frequency may be set as the number of times the internal combustion engine is driven, and, when the number of times the internal combustion engine is driven is larger than a predetermined number of times, the calculated electric power consumption rate or the information acquired to calculate the electric power consumption rate may be invalidated.

Particularly, in the case where the driving frequency is set as the accumulated driving time of the internal combustion engine or the number of times the internal combustion engine is driven, it is possible to determine whether to invalidate the calculated electric power consumption rate or whether to invalidate the information acquired to calculate the electric power consumption rate in a trip, so, after that, it is not necessary to acquire the information, and it is possible to avoid unnecessary information acquisition operation.

On the other hand, in the case where the driving frequency is set as the rate of the accumulated driving time of the internal combustion engine with respect to the total travel distance in one trip, when the total travel time of one trip is relatively long, it is possible to properly determine whether to invalidate the calculated electric power consumption rate or whether to invalidate the information acquired to calculate the electric power consumption rate. That is, for example, even when the accumulated driving time of the internal combustion engine in one trip is relatively long, but when the total travel time of one trip extends over a long period of time, a period during which the internal combustion engine is stopped is also long (which means that a period during which information that allows an electric power consumption rate to be properly calculated is long), so an error due to the fact that the internal combustion engine has been driven relatively reduces. Therefore, in such a situation, it is desirable to learn a latest learned value of an electric power consumption rate by calculating an electric power consumption rate without invalidating the calculated electric power consumption rate or the information acquired to calculate the electric power consumption rate. In this way, when it is determined on the basis of the rate of the accumulated driving time of the internal combustion engine with respect to the total travel time in one trip, the calculated electric power consumption rate or the information acquired to calculate the electric power consumption rate is not invalidated more than necessary.

As an example drive mode of the plug-in hybrid vehicle, the vehicle is able to travel in a first drive mode in which the vehicle preferentially travels with only the electric motor as the driving force source and in a second drive mode in which the vehicle preferentially travels with both the electric motor and the internal combustion engine as the driving force source. In this case, the electric power consumption rate may be learned by incorporating an electric power consumption rate calculated on the basis of an electric power consumption and a travel distance in a period during which the vehicle has traveled with the use of only the electric motor as the driving force source in the first drive mode.

In addition, the vehicle may be caused to travel in the first drive mode when an amount of electric power stored in the electrical storage device is larger than or equal to a predetermined amount and may be caused to travel in the second drive mode when the amount of electric power stored in the electrical storage device is smaller than the predetermined value.

By learning an electric power consumption rate for only the first drive mode in this way, the learned value of the electric power consumption rate in the case where the vehicle travels with only the electric motor as the driving force source is properly obtained, and, when a distance-to-empty is calculated from the learned value, it is possible to increase the accuracy of calculating the distance-to-empty.

In the aspect of the invention, in learning an electric power consumption rate of the plug-in hybrid vehicle, when the driving frequency in the case where the internal combustion engine is driven as the vehicle travels on an uphill or a downhill is high, the calculated electric power consumption rate or the information acquired to calculate the electric power consumption rate is invalidated. By so doing, it is possible not to incorporate the calculated electric power consumption rate that includes an error into learning of the electric power consumption rate, so it is possible to maintain the high accuracy of the learned value of the electric power consumption rate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the present embodiment, a plug-in hybrid vehicle that includes two motor generators and that is configured as a front-engine front-drive (FF) vehicle will be described as an example. The plug-in hybrid vehicle is a hybrid vehicle on which a charging device for charging a driving battery is mounted and that has the function of being chargeable from a domestic power supply. Hereinafter, the plug-in hybrid vehicle may be simply referred to as hybrid vehicle where appropriate.

Figure 1:
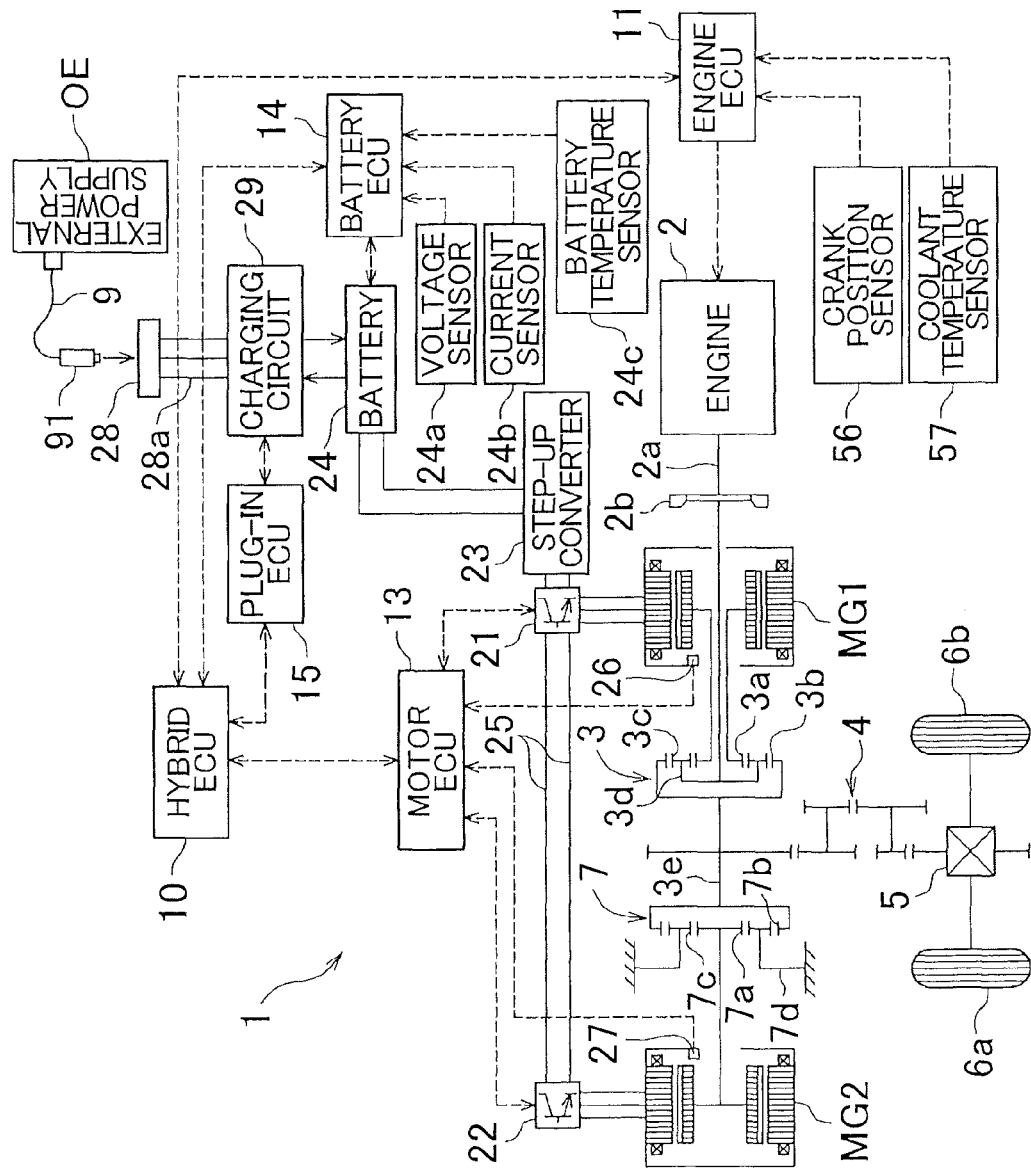
FIG. 1 is a view that shows the schematic configuration of a plug-in hybrid vehicle and the schematic configuration of an external power supply according to an embodiment of the invention.

FIG. 1 is a view that shows the schematic configuration of a plug-in hybrid vehicle 1 and the schematic configuration of an external power supply OE. As shown in FIG. 1, the plug-in hybrid vehicle 1 includes an engine 2, a triaxial power split mechanism 3, a first motor generator MG1 and a second motor generator MG2 as a drive system for supplying driving force to front wheels (drive wheels) 6a and 6b. The triaxial power split mechanism 3 is connected to a crankshaft 2a via a damper 2b. The crankshaft 2a serves as an output shaft of the engine 2. The first motor generator MG1 is connected to the power split mechanism 3, and is able to generate electric power. The second motor generator MG2 is connected to the power split mechanism 3, and is connected to a ring gear shaft 3e, which serves as a drive shaft, via a reduction mechanism 7. The second motor generator MG2 serves as an electric motor according to the aspect of the invention. These crankshaft 2a, power split mechanism 3, first motor generator MG1, second motor generator MG2, reduction mechanism 7 and ring gear shaft 3e constitute a powertrain.

The ring gear shaft 3e is connected to the front wheels 6a and 6b via a gear mechanism 4 and a front wheel differential gear 5.

The plug-in hybrid vehicle 1 includes a hybrid electronic control unit (hereinafter, referred to as hybrid ECU) 10 that comprehensively controls the drive system of the vehicle.

The engine and an engine ECU will be described first. The engine 2 is an internal combustion engine that outputs power using a hydrocarbon fuel, such as gasoline and light oil. The engine 2 is subjected to operation control, such as fuel injection control, ignition control and intake air flow rate regulating control, by an engine electronic control unit (hereinafter, referred to as engine ECU) 11. The engine ECU 11 receives signals from various sensors that detect an operating state of the engine 2. The engine ECU 11 communicates with the hybrid ECU 10. The engine ECU 11 executes operation control over the engine 2 on the basis of a control signal from the hybrid ECU 10, and, where necessary, outputs data about the operating state of the engine 2 to the hybrid ECU 10. A crank position sensor 56, a fluid temperature sensor 57, and the like, are connected to the engine ECU 11. The crank position sensor 56 outputs a detected signal (pulse) each time the crankshaft 2a rotates by a set angle. The engine ECU 11 calculates an engine rotation speed (the number of revolutions) Ne on the basis of an output signal from the crank position sensor 56. The fluid temperature sensor 57 outputs a detected signal based on a coolant temperature of the engine 2.

Next, the power split mechanism will be described. As shown in FIG. 1, the power split mechanism 3 includes a sun gear 3a, a ring gear 3b, a plurality of pinions 3c and a planetary carrier 3d. The sun gear 3a is an external gear. The ring gear 3b is an internal gear and is arranged concentrically with the sun gear 3a. The plurality of pinions 3c are in mesh with the sun gear 3a and are in mesh with the ring gear 3b. The planetary carrier 3d holds these plurality of pinions 3c such that the pinions 3c are rotatable and revolvable. The power split mechanism 3 is configured as a planetary gear mechanism that carries out differential action using the sun gear 3a, the ring gear 3b and the planetary carrier 3d as rotating elements. In the power split mechanism 3, the crankshaft 2a of the engine 2 is coupled to the planetary carrier 3d. A rotor of the first motor generator MG1 is coupled to the sun gear 3a. The reduction mechanism 7 is coupled to the ring gear 3b via the ring gear shaft 3e.

In the thus configured power split mechanism 3, when a reaction torque generated by the first motor generator MG1 is input to the sun gear 3a against an output torque of the engine 2, which is input to the planetary carrier 3d, a torque larger than the torque input from the engine 2 appears at the ring gear 3b that serves an output element. In this case, the first motor generator MG1 functions as a generator. When the first motor generator MG1 functions as a generator, the driving force of the engine 2, which is input from the planetary carrier 3d, is distributed between the sun gear 3a and the ring gear 3b on the basis of the gear ratio.

On the other hand, at the time of a request to start the engine 2, the first motor generator MG1 functions as an electric motor (starter), the driving force of the first motor generator MG1 is transmitted to the crankshaft 2a via the sun gear 3a and the planetary carrier 3d, and the engine 2 is cranked.

In the power split mechanism 3, it is possible to continuously (steplessly) vary the rotation speed of the engine 2 by increasing or decreasing the rotation speed of the first motor generator MG1 when the rotation speed of the ring gear 3b (output shaft rotation speed) is constant. That is, the power split mechanism 3 functions as a speed change unit.

Next, the reduction mechanism will be described. As shown in FIG. 1, the reduction mechanism 7 includes a sun gear 7a, a ring gear 7b, a plurality of pinions 7c and a planetary carrier 7d. The sun gear 7a is an external gear. The ring gear 7b is an internal gear, and is arranged concentrically with the sun gear 7a. The plurality of pinions 7c are in mesh with the sun gear 7a and are in mesh with the ring gear 7b. The planetary carrier 7d holds these plurality of pinions 7c such that the pinions 7c are rotatable. In the reduction mechanism 7, the planetary carrier 7d is fixed to a transmission case. The sun gear 7a is coupled to a rotor of the second motor generator MG2. The ring gear 7b is coupled to the ring gear shaft 3e.

Next, a power switch will be described. The plug-in hybrid vehicle 1 includes the power switch 51 (see FIG. 2) that is used to change between a start and stop of a hybrid system. The power switch 51 is, for example, a snap push switch and, each time the power switch 51 is pushed, the power switch 51 alternately turns on and off.

Here, the hybrid system uses the engine 2 and the motor generators MG1 and MG2 as driving force sources, and controls a travel of the plug-in hybrid vehicle 1 by executing various controls including operation control over the engine 2, drive control over the motor generators MG1 and MG2, coordinate control over the engine 2 and the motor generators MG1 and MG2, and the like.

When a passenger including the driver operates the power switch 51, the power switch 51 outputs a signal corresponding to the operation (IG-On command signal or IG-Off command signal) to the hybrid ECU 10. The hybrid ECU 10 starts or stops the hybrid system on the basis of, for example, the signal output from the power switch 51.

Specifically, when the power switch 51 is operated during a stop of the plug-in hybrid vehicle 1, the hybrid ECU 10 starts the hybrid system at a P position (described later). By so doing, the vehicle enters a travelable state. At the time of a start of the hybrid system during a vehicle stop, the hybrid system is started at the P position, so driving force is not output even in an accelerator on state. The state where the vehicle is travelable is a state where it is possible to control a travel of the vehicle by a command signal from the hybrid ECU 10, and is a state (Ready-On state) where, when the driver depresses the accelerator, the plug-in hybrid vehicle 1 is able to start and travel. Note that the Ready-On state also includes a state where the engine 2 is stopped and it is possible to cause the plug-in hybrid vehicle 1 to start and travel (travel in an EV drive mode) with the use of the second motor generator MG2.

For example, while the hybrid system is in operation, when the power switch 51 is operated (for example, pushed in a short period of time) at the P position during a stop of the vehicle, the hybrid ECU 10 stops the hybrid system.

Next, the motor generators and a motor ECU will be described. The motor generators MG1 and MG2 each are formed of a known synchronous motor generator that is able to be driven as a generator and is able to be driven as an electric motor, and exchange electric power with a battery (electrical storage device) 24 via inverters 21 and 22 and a step-up converter 23. Power lines 25 that connect the inverters 21 and 22, the step-up converter 23 and the battery 24 to one another are respectively formed of a positive electrode bus and a negative electrode bus that are shared by the inverters 21 and 22. Electric power generated by one of the motor generators MG1 and MG2 is allowed to be consumed by the other motor. Thus, the battery 24 is charged with electric power generated from one of the motor generators MG1 and MG2 or discharged for an insufficient amount of electric power. When a balance of input and output electric powers is kept by the motor generators MG1 and MG2, the battery 24 is not charged or discharged.

The motor generators MG1 and MG2 each are subjected to drive control by a motor electronic control unit (hereinafter, referred to as motor ECU) 13. Signals required to execute drive control over the motor generators MG1 and MG2, for example, a signal from an MG1 rotation speed sensor (resolver) 26 that detects the rotational position of the rotor (rotary shaft) of the motor generator MG1, a signal from an MG2 rotation speed sensor 27 that detects the rotational position of the rotor (rotary shaft) of the motor generator MG2, phase currents that are applied to the motor generators MG1 and MG2 and that are detected by a current sensor, are input to the motor ECU 13. Switching control signals are output from the motor ECU 13 to the inverters 21 and 22. For example, one of the motor generators MG1 and MG2 is subjected to drive control (for example, the second motor generator MG2 is subjected to regenerative control) as a generator or subjected to drive control (for example, the second motor generator MG2 is subjected to power running control) as an electric motor. In addition, the motor ECU 13 communicates with the hybrid ECU 10. The motor ECU 13 executes drive control over the motor generators MG1 and MG2 as described above in accordance with control signals from the hybrid ECU 10, and, where necessary, outputs data about the operating states of the motor generators MG1 and MG2 to the hybrid ECU 10.

Next, the battery and a battery ECU will be described. The battery 24 is formed of a battery pack that is formed by connecting a plurality of battery modules in which a plurality of battery cells are integrated are further connected in series with each other. The voltage of the battery 24 is, for example, about 200 V. The battery 24 is chargeable with not only electric power supplied from the first motor generator MG1 or the second motor generator MG2 but also electric power supplied from the external power supply OE outside the vehicle. A capacitor may be used instead of the battery 24 or in addition to the battery 24.

The battery 24 is managed by the battery electronic control unit (hereinafter, referred to as battery ECU) 14. Signals required to manage the battery 24, such as a terminal voltage from a voltage sensor 24a provided between the terminals of the battery 24, a charge/discharge current from a current sensor 24b connected to one of the power lines 25, connected to the output terminal of the battery 24, and a battery temperature Tb from a battery temperature sensor 24c connected to the battery 24, are input to the battery ECU 14. The battery ECU 14, where necessary, outputs data about the state of the battery 24 to the hybrid ECU 10 through communication.

In order to manage the battery 24, the battery ECU 14 computes a remaining level SOC (state of charge) of electric power on the basis of an accumulated value of charge/discharge current detected by the current sensor 24b, and computes an input limit Win and an output limit Wout that are maximum allowable electric powers at which the battery 24 may be charged and discharged on the basis of the computed remaining level SOC and the battery temperature Tb detected by the battery temperature sensor 24c. The input limit Win and output limit Wout of the battery 24 may be set as follows. Basic values of the input limit Win and output limit Wout are set on the basis of the battery temperature Tb, an input limit correction coefficient and an output limit correction coefficient are set on the basis of the remaining level SOC of the battery 24, and the set basic values of the input limit Win and output limit Wout are respectively multiplied by the correction coefficients.

Note that the battery ECU 14 is incorporated in the hybrid ECU 10, and a power management ECU may be formed of these ECUs.

Next, the charging device and a plug-in ECU will be described. As described above, the plug-in hybrid vehicle 1 is able to charge the battery 24 by utilizing the external power supply OE, such as a domestic power supply.

Specifically, the plug-in hybrid vehicle 1 includes an inlet 28 on a side face, or the like, of a vehicle body. The inlet 28 serves as a power receiving unit. A charging circuit 29 is connected to the inlet 28 via power supply lines 28a.

The charging circuit 29 converts alternating current, supplied from the external power supply OE, to direct current and then supplies the direct current to the battery 24. In addition, the plug-in ECU 15 is connected to the charging circuit 29, and a control signal, a signal about the state of charge, and the like, are exchanged between the charging circuit 29 and the plug-in ECU 15. In addition, the plug-in ECU 15 exchanges a control signal, a signal about the state of charge, and the like, with the hybrid ECU 10. The plug-in ECU 15 controls the amount of electric power, with which the battery 24 is charged, on the basis of a control signal from the hybrid ECU 10.

Figure 3:
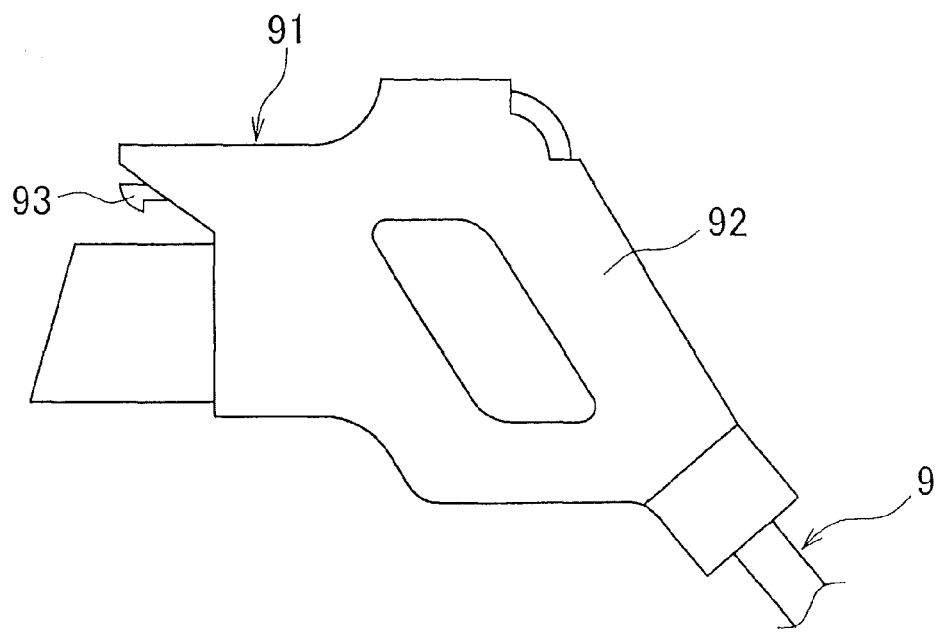
FIG. 3 is a view that shows a connector provided at the distal end of a charging cable shown in FIG. 1.

In addition, a connector 91 provided at the distal end of a charging cable 9 connected to the external power supply OE is connectable to the inlet 28. As shown in FIG. 3, the connector 91 includes a handle 92 and an engaging hook 93. The handle 92 is gripped by a worker at the time of charging work. When the connector 91 is connected to the inlet 28, the engaging hook 93 engages with the inlet 28.

A switch (not shown) that closes in synchronization with engagement of the engaging hook 93 with the inlet 28 is provided inside the connector 91. When the connector 91 is connected (inserted) to the inlet 28, the switch closes, and electric power from the external power supply OE is supplied to the battery 24 via the charging cable 9, the connector 91, the inlet 28 and the charging circuit 29. In addition, when the connector 91 is connected to the inlet 28 in this way and charging of the battery 24 is started, the plug-in ECU 15 detects that start of charging, and outputs a connector signal CNCT that is a charging start signal to the hybrid ECU 10. As will be described later, the timing at which the hybrid ECU 10 receives the connector signal CNCT is the timing at which an electric power consumption rate is calculated using an electric power consumption and a travel distance that are accumulated in a last trip (a period during which the vehicle has traveled after last charging operation (a period during which the vehicle has traveled before current charging)) and the timing at which a learned electric power consumption rate is learned.

Figure 2:
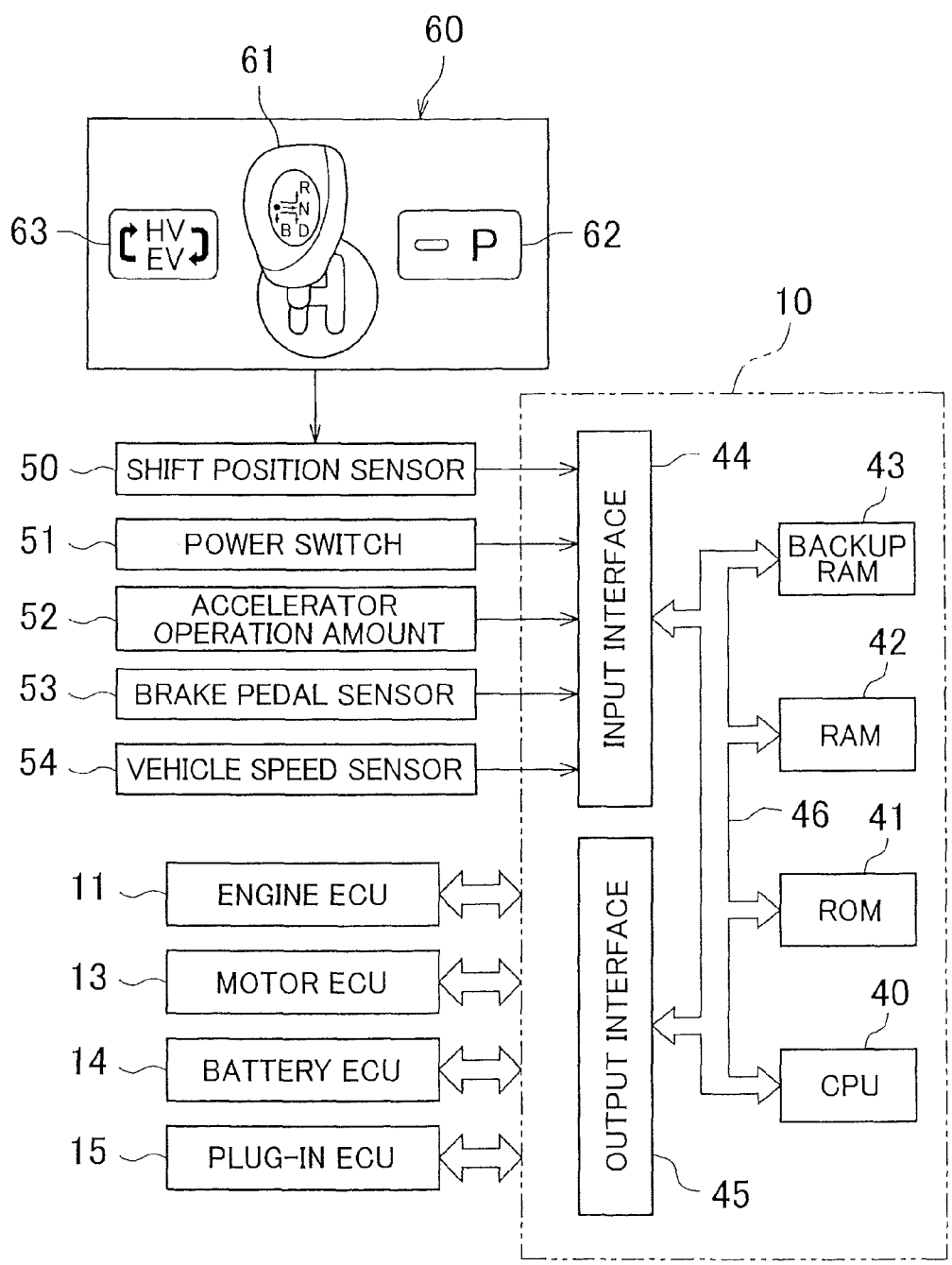
FIG. 2 is a block diagram that shows the schematic configuration of a control system of the plug-in hybrid vehicle shown in FIG. 1.

Next, the hybrid ECU and a control system will be described. As shown in FIG. 2, the hybrid ECU 10 includes a central processing unit (CPU) 40, a read only memory (ROM) 41, a random access memory (RAM) 42, a backup RAM 43, and the like. The ROM 41 stores various control programs and maps, and the like. The maps are consulted at the time when those various control programs are executed. The CPU 40 executes arithmetic processing on the basis of the various control programs and maps stored in the ROM 41. The RAM 42 is a memory that temporarily stores computation results in the CPU 40, data input from sensors, and the like. The backup RAM 43 is a nonvolatile memory that stores data, and the like, to be saved, for example, at the time of IG-Off.

The above-described CPU 40, ROM 41, RAM 42 and backup RAM 43 are connected to one another via a bus 46, and are connected to an input interface 44 and an output interface 45.

A shift position sensor 50, the power switch 51, an accelerator operation amount sensor 52, a brake pedal sensor 53, a vehicle speed sensor 54, and the like, are connected to the input interface 44. The shift position sensor 50 detects an operating position, or the like, of a shift lever 61 of a shift operating device 60 (described later). The accelerator operation amount sensor 52 outputs a signal corresponding to a depression amount of an accelerator pedal. The brake pedal sensor 53 outputs a signal corresponding to a depression amount of a brake pedal. The vehicle speed sensor 54 outputs a signal corresponding to a vehicle body speed.

By so doing, a shift position signal from the shift position sensor 50, an IG-On signal and an IG-Off signal from the power switch 51, an accelerator operation amount signal from the accelerator operation amount sensor 52, a brake pedal position signal from the brake pedal sensor 53, a vehicle speed signal from the vehicle speed sensor 54, and the like, are input to the hybrid ECU 10.

Here, the shift operating device 60 will be simply described. The shift operating device 60 is arranged near a driver seat, and includes the shift lever (may also be called shift knob) 61, a P switch 62 and a mode selection switch 63. The shift lever 61 is operable to be displaced. The P switch 62 is operable to be pushed in. The mode selection switch 63 allows the drive mode of the hybrid system to be manually changed.

The shift operating device 60 has set a forward drive range (D range), a forward brake range (B range), a reverse range (R range) and a neutral range (N range). In the forward brake range, braking force (engine braking) is large while an accelerator is off. The driver is allowed to displace the shift lever 61 to a desired range. Positions of these D range, B range, R range and N range are detected by the shift position sensor 50. An output signal of the shift position sensor 50 is input to the hybrid ECU 10.

The P switch 62 is used to set the parking position (P position) through driver's push operation, and a push signal of the P switch 62 is also detected by the shift position sensor 50. With the push operation of the P switch 62, a parking ECU (not shown) receives a command signal from the hybrid ECU 10, and a parking lock mechanism is activated to indirectly lock the front wheels 6a and 6b.

The mode selection switch 63 is to change the drive mode of the hybrid system between the "CD mode (also called EV mode)" and the "CS mode (also called HV mode)" in a situation that the remaining level SOC of the battery 24 is higher than or equal to a predetermined level, and the drive mode of the hybrid system is alternately changed between the CD mode (EV mode) and the CS mode (HV mode) each time the mode selection switch 63 is pushed. A push signal of the mode selection switch 63 is also detected by the shift position sensor 50. These CD mode (also termed first drive mode) and CS mode (also termed second drive mode) will be described later.

On the other hand, the engine ECU 11, the motor ECU 13, the battery ECU 14, the plug-in ECU 15, and the like, are connected to the input interface 44 and the output interface 45, and the hybrid ECU 10 exchanges various control signals and data with these engine ECU 11, motor ECU 13, battery ECU 14 and plug-in ECU 15.

The hybrid ECU 10 executes various controls over the engine 2, including throttle opening degree control (intake air flow rate control), fuel injection amount control, ignition timing control, and the like, of the engine 2 on the basis of output signals of the various sensors. The hybrid ECU 10 automatically changes between the CD mode and the CS mode to cause the plug-in hybrid vehicle 1 to travel on the basis of the vehicle speed, the accelerator operation amount, the remaining level SOC of electric power of the battery 24, and the like. The hybrid ECU 10 also executes information acquisition operation for calculating an electric power consumption rate (described later), electric power consumption rate calculation operation that uses these pieces of information and electric power consumption rate learning operation.

Next, the flow of driving force in the plug-in hybrid vehicle 1 will be described. The flow of driving force is basically common to the CD mode and the CS mode, so the flow of driving force will be described without distinguishing the modes from each other.

The plug-in hybrid vehicle 1 calculates a torque (required torque) that should be output to the drive wheels 6a and 6b on the basis of the accelerator operation amount Acc corresponding to the driver's depression amount of the accelerator pedal and the vehicle speed V, and then executes operation control over the engine 2 and the motor generators MG1 and MG2 so as to travel by a required driving force corresponding to the required torque. Specifically, in order to reduce a fuel consumption, in an operation region in which the required driving force is relative low, the plug-in hybrid vehicle 1 is configured to obtain the required driving force with the use of the second motor generator MG2. On the other hand, in an operation region in which the required driving force is relatively high, the second motor generator MG2 is utilized and the engine 2 is driven, and then the plug-in hybrid vehicle 1 is configured to obtain the required driving force from driving force generated by these driving force sources.

More specifically, when the vehicle, for example, starts or travels at a low speed and the operation efficiency of the engine 2 is low, the vehicle travels with the use of only the second motor generator MG2.

On the other hand, when both the driving force of the engine 2 and the driving force of the second motor generator MG2 are used, for example, the driving force of the engine 2 is split by the power split mechanism 3 into two routes (torque split), one of the split driving forces is used to directly drive the drive wheels 6a and 6b (through direct torque), and the other one of the split driving forces is used to drive the first motor generator MG1 to generate electric power. At this time, the second motor generator MG2 is driven on electric power that is generated by driving the first motor generator MG1 to thereby assist in driving the drive wheels 6a and 6b (through an electrical path).

In this way, the power split mechanism 3 functions as a differential mechanism, mechanically transmits a main part of power from the engine 2 to the drive wheels 6a and 6b by its differential action, and electrically transmits the remaining part of the power from the engine 2 from the first motor generator MG1 to the second motor generator MG2 using the electrical path. By so doing, the function of an electrical continuously variable transmission of which the speed ratio is electrically varied is exhibited. Thus, independent of the rotation speed and torque of the drive wheels 6a and 6b (ring gear shaft 3e), it is possible to freely operate the engine rotation speed and the engine torque, and it is possible to obtain the operating state of the engine 2 with an optimized fuel consumption rate (operating state on an optimal fuel consumption operation line (described later)) while the driving force required for the drive wheels 6a and 6b is obtained.

Figure 4:
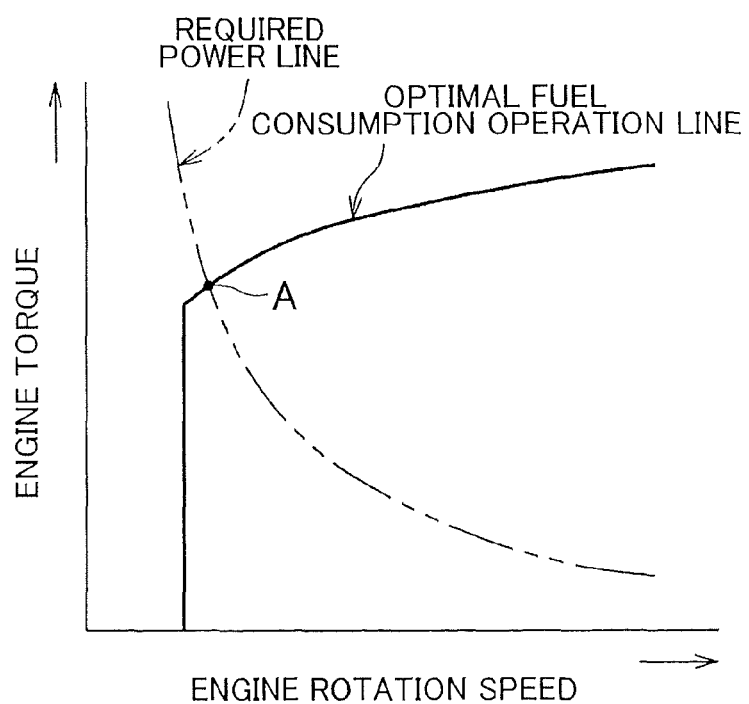
FIG. 4 is a graph for illustrating an operating point of an engine shown in FIG. 1.

Specifically, description will be made with reference to FIG. 4. FIG. 4 is a graph that shows the operating point of the engine 2. In FIG. 4, the abscissa axis represents engine rotation speed, and the ordinate axis represents engine torque. The solid line in the graph indicates an optimal fuel consumption operation line, and it is possible to control the engine 2 to an operating state on the optimal fuel consumption operation line through the above-described electrical shift function using the power split mechanism 3. Specifically, the hybrid system is controlled such that the intersection (point A in the graph) of a required power line (line indicated by the alternate long and two short dashes line in the graph) that is determined on the basis of the accelerator operation amount, and the like, and the optimal fuel consumption operation line is set as a target operation point (target operating point) of the engine 2.

During high-speed travel, the power of the second motor generator MG2 is increased by further supplying electric power from the battery 24 to the second motor generator MG2, thus adding driving force (driving force assist; power running) to the drive wheels 6a and 6b.

During deceleration, the second motor generator MG2 functions as a generator to regenerate electric power, and stores recovered electric power in the battery 24. When the amount of charge (remaining level; SOC) of the battery 24 decreases and charging is particularly required, the power of the engine 2 is increased to increase the amount of electric power that is generated by the first motor generator MG1, thus increasing the amount of electric power with which the battery 24 is charged (mainly operation in the CS mode). Even during low-speed travel, control for increasing the power of the engine 2 may be executed as needed. This is, for example, the case where charging of the battery 24 is required as described above, the case where an auxiliary, such as an air conditioner, is driven, the case where the temperature of coolant of the engine 2 is increased to a predetermined temperature, or the like.

In the plug-in hybrid vehicle 1 according to the present embodiment, the engine 2 is stopped on the basis of the driving state of the vehicle and the state of the battery 24 in order to improve fuel economy. After that, the driving state of the plug-in hybrid vehicle 1 and the state of the battery 24 are detected, and the engine 2 is restarted. In this way, in the plug-in hybrid vehicle 1, even when the power switch 51 is at an ON position, the engine 2 is intermittently operated (operation to repeat a stop of the engine and a restart of the engine).

Next, the CD (EV) mode and the CS (HV) mode will be described with reference to FIG. 5 and FIG. 6. The hybrid ECU 10 determines to select one of the CD mode and the CS mode on the basis of the remaining level SOC of the battery 24. Specifically, when the remaining level SOC of the battery 24 is higher than or equal to a predetermined level (threshold; for example, 25% with respect to a total amount of chargeable electric power), the CD mode is selected, and the drive mode is set to the mode in which the vehicle preferentially travels on only the power of the second motor generator MG2. On the other hand, when the remaining level SOC of the battery 24 is lower than the predetermined level (threshold), the CS mode is selected, and the drive mode is set to the mode in which the vehicle preferentially travels on both the power of the engine 2 and the power of the second motor generator MG2.

Figure 5:
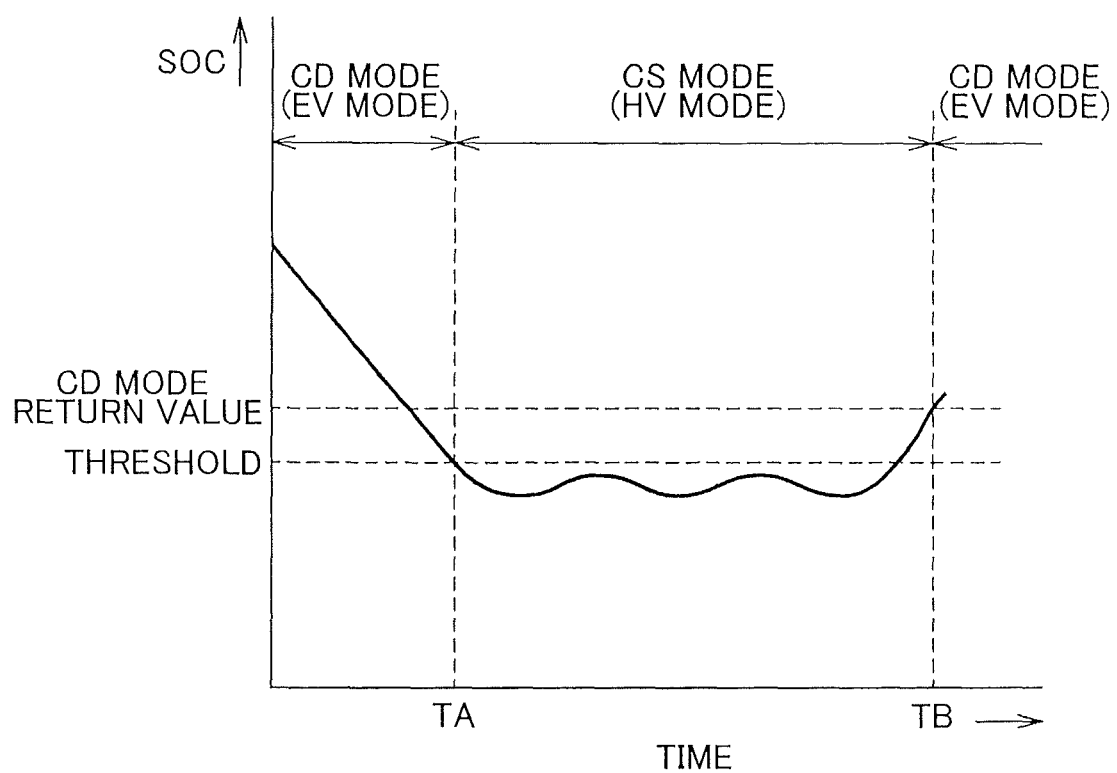
FIG. 5 is a graph for illustrating a CD mode and a CS mode in a drive mode of the plug-in hybrid vehicle shown in FIG. 1, and is a view that shows an example of a temporal variation in SOC in the case where the drive mode is changed between the CD mode and the CS mode.

Specifically, as shown in FIG. 5 (graph that shows an example of a temporal variation in SOC in the case where the drive mode is changed between the CD mode and the CS mode), the vehicle continues to travel in the CD mode, and, when the remaining level SOC of the battery 24 becomes lower than the predetermined level (threshold), the drive mode is changed to the CS mode (timing TA in the graph). In the CS mode, the vehicle preferentially travels on both the power of the engine 2 and the power of the second motor generator MG2. By so doing, a further decrease in the remaining level SOC is suppressed. On the other hand, while the vehicle is travelling in the CS mode, when the remaining level SOC increases to a predetermined level (a CD mode return value in the graph) due to regenerative operation, or the like, of the second motor generator MG2, the drive mode is returned to the CD mode (timing TB in the graph). In this way, on the basis of the remaining level SOC of the battery 24, the hybrid ECU 10 changes the drive mode between the CD mode and the CS mode.

When the remaining level SOC of the battery 24 is relatively high (for example, higher than or equal to the threshold), the driver is allowed to select the CD mode or the CS mode by manually operating the mode selection switch 63.

In any of these CD mode and CS mode, there are a driving state in which the vehicle travels on only the power of the second motor generator MG2 and a driving state in which the vehicle travels on both the power of the engine 2 and the power of the second motor generator MG2. Between these CD mode and the CS mode, a required power to start the engine 2 is different. Specifically, the required power to start the engine 2 in the CD mode is set to a larger value than the required power to start the engine 2 in the CS mode. Therefore, even with the same required power (the same accelerator operation amount), the engine 2 may be not started in the CD mode, and the engine 2 may be started in the CS mode.

Figure 6:
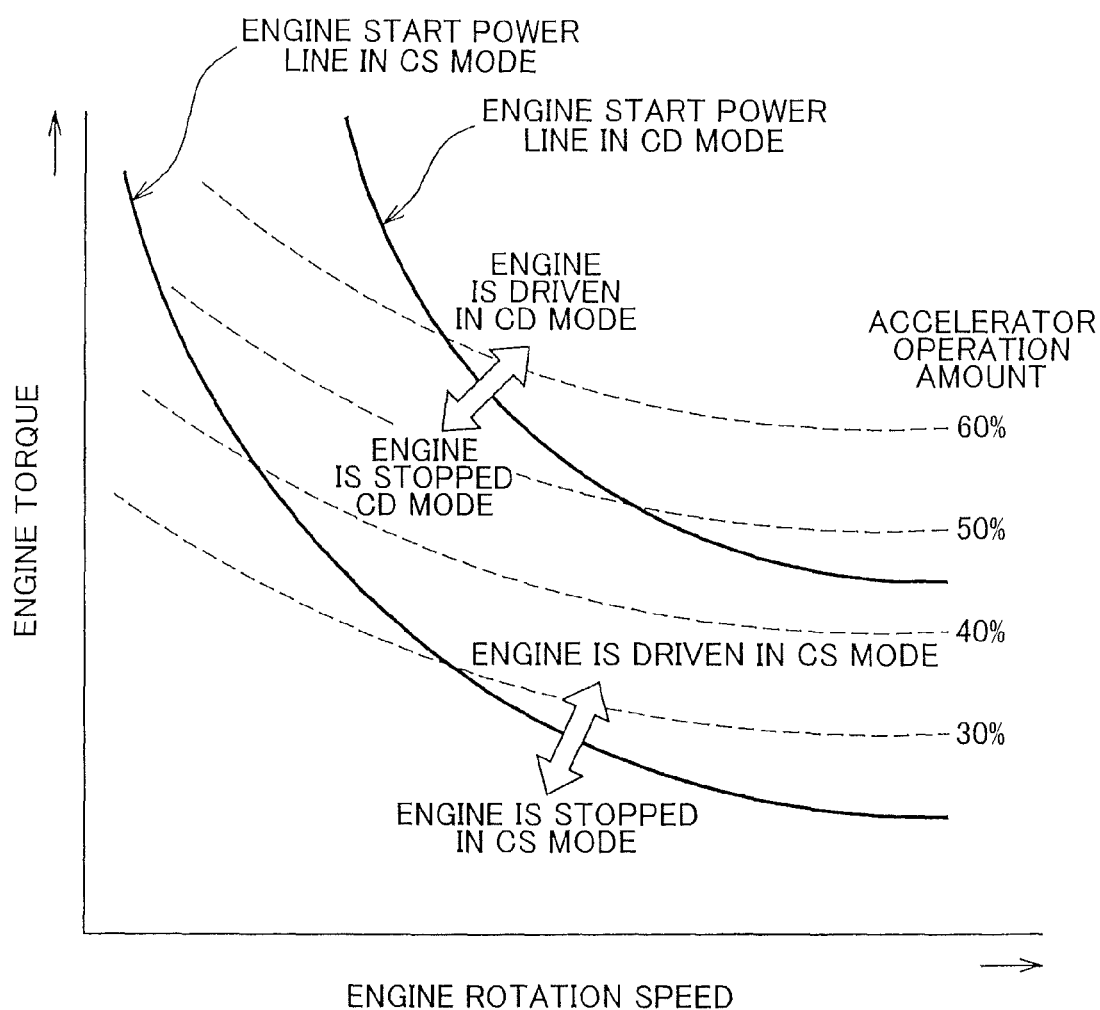
FIG. 6 is a view that shows an example of a map for changing the drive mode of the plug-in hybrid vehicle shown in FIG. 1 between the CD mode and the CS mode and between an engine start and an engine stop in each mode.

FIG. 6 shows an example of a map that is used to change the drive mode between the CD mode and the CS mode and to change between a start and stop of the engine in each mode. As shown in FIG. 6, an engine start power line in the CD mode and an engine start power line in the CS mode are set as required powers (expressed by the product of the engine rotation speed and the engine torque) that are set on the basis of the accelerator operation amount, and the like, and the engine start power line in the CD mode is set to be higher in power than the engine start power line in the CS mode. For example, the engine start power line is 40 kW in the CD mode, and the engine start power line is 20 kW in the CS mode. These engine start power lines are not limited to these values, and may be set appropriately.

Therefore, in the case where the remaining level SOC of the battery 24 is higher than or equal to the predetermined level (threshold) and the vehicle is travelling in the CD mode, when the required power that is set on the basis of the accelerator operation amount (see the broken line in the graph), and the like, is lower than the engine start power line in the CD mode, the vehicle travels on only the power of the second motor generator MG2 (the engine is stopped); whereas, when the required power that is set on the basis of the accelerator operation amount, and the like, is higher than the engine start power line in the CD mode, the vehicle travels on both the power of the engine 2 and the power of the second motor generator MG2. An operation region that is higher than the engine start power line in the CD mode is a relatively limited operation region (for example, during full acceleration (during WOT)), so, in the CD mode, the vehicle preferentially travels on only the power of the second motor generator MG2 (the engine is stopped).

Similarly, in the case where the remaining level SOC of the battery 24 is lower than the predetermined level (threshold) and the vehicle is travelling in the CS mode, when the required power that is set on the basis of the accelerator operation amount (see the broken line in the graph), and the like, is lower than the engine start power line in the CS mode, the vehicle travels on only the power of the second motor generator MG2 (the engine is stopped); whereas, when the required power that is set on the basis of the accelerator operation amount, and the like, is higher than the engine start power line in the CS mode, the vehicle travels on both the power of the engine 2 and the power of the second motor generator MG2. An operation region that is lower than the engine start power line in the CS mode is relatively limited operation region (for example, during idling operation or during low-load operation), so, in the CS mode, the vehicle preferentially travels on both the power of the engine 2 and the power of the second motor generator MG2. While the vehicle is travelling in the CS mode, even when the required power is lower than the engine start power line in the CS mode but when the remaining level SOC of the battery 24 is further decreased (when the remaining level SOC is decreased to a level such that a deviation from the predetermined level (threshold) is larger than or equal to a predetermined amount), the engine 2 is started in order to charge the battery 24 (through regenerative operation of the first motor generator MG1).

In this way, in the CD mode, control is executed such that the engine 2 is stopped as much as possible and the plug-in hybrid vehicle 1 travels on only the power of the second motor generator MG2. By so doing, improvement in fuel consumption rate is attempted. On the other hand, in the CS mode, control is executed such that the frequency at which the engine 2 is driven is higher than that in the CD mode and the plug-in hybrid vehicle 1 efficiently travels with the use of both the engine 2 and the second motor generator MG2. By so doing, while the required power is satisfied, a decrease in the remaining level SOC of the battery 24 is suppressed. While the vehicle is travelling in the CS mode, when the remaining level SOC of the battery 24 increases (the remaining level SOC increases due to regenerative operation, or the like, of the second motor generator MG2) and then the remaining level SOC becomes higher than or equal to the predetermined level (the above-described CD mode return value), the drive mode is returned to the CD mode, and the engine start power line is changed from the engine start power line in the CS mode to the engine start power line in the CD mode.

Next, basic operation of learning an electric power consumption rate will be described. The plug-in hybrid vehicle 1 according to the present embodiment is configured to learn a travel distance per unit amount of electric power in the case where the vehicle 1 is travelling in the CD mode as an electric power consumption rate. A distance-to-empty (a distance that can be traveled by only the driving force of the second motor generator MG2) is calculated by multiplying the learned electric power consumption rate by the state of charge SOC of the battery 24 (the state of charge that is usable until it reaches the predetermined value at which the drive mode is changed to the CS mode), the distance-to-empty is indicated on a meter panel.

The basic operation of learning an electric power consumption rate will be described below. An electric power consumption rate is learned as follows. An electric power consumption rate (hereinafter, referred to as "trip electric power consumption rate" where appropriate) in one trip (a period from when the battery 24 is charged from the external power supply OE and then the vehicle 1 starts travelling to when the battery 24 is charged from the external power supply OE again) is calculated, and the calculated trip electric power consumption rate is incorporated into a learned electric power consumption rate learned in the past.

That is, the connector 91 is connected to the inlet 28 and the battery 24 is charged (at this time, the hybrid ECU 10 receives the connector signal CNCT from the plug-in ECU 15 to recognize that charging is started), and, after that, the operation to calculate a trip electric power consumption rate for one trip (current trip) is started from the time when the power switch 51 is turned on. Specifically, in the case where the plug-in hybrid vehicle 1 starts travelling and is travelling in the CD mode, an electric power consumption and a travel distance are accumulated during a period in which the engine 2 is stopped (during a period in which the vehicle 1 is travelling by only the driving force of the second motor generator MG2). The electric power consumption is computed by the battery ECU 14 on the basis of information about the charge/discharge current detected by the current sensor 24b, and the like, and the computed signal is transmitted to the hybrid ECU 10. The travel distance is calculated by the hybrid ECU 10 on the basis of the signal from the vehicle speed sensor 54.

Accumulation of the electric power consumption and travel distance is temporarily stopped during a period in which the drive mode is changed to the CS mode or during a period in which the engine 2 is driven even in the CD mode.

The thus accumulated electric power consumption and travel distance are stored, and, after the end of the trip and at the time of the next charging (at the time when the connector 91 is connected to the inlet 28; at the time when the hybrid ECU 10 has received the connector signal CNCT), the stored travel distance is divided by the stored electric power consumption (the ratio of the amount of electric power actually consumed with respect to the total amount of chargeable electric power of the battery 24). By so doing, a trip electric power consumption rate (km/%) in the last travel (last trip) is calculated.

The thus obtained trip electric power consumption rate is incorporated into the previously learned electric power consumption rate (km/%) learned through electric power consumption rate learning operation. By so doing, the learned electric power consumption rate is updated. When the vehicle 1 travels in the CD mode next time, a distance-to-empty is calculated by multiplying the learned electric power consumption rate by the state of charge SOC (the state of charge that is usable until it reaches the predetermined value at which the drive mode is changed to the CS mode) of the battery 24, and the distance-to-empty is indicated on the meter panel. While the vehicle is travelling in the CD mode next time, the distance-to-empty (indication on the meter panel) varies with a change in the state of charge SOC of the battery 24. For example, when electric power is consumed as driving energy and the state of charge SOC is decreased, the distance-to-empty reduces. On the other hand, the battery 24 is charged through regenerative operation, or the like, of the second motor generator MG2, and the state of charge SOC is increased, the distance-to-empty extends.

There are presumably various methods of calculating a latest learned electric power consumption rate by incorporating a trip electric power consumption rate obtained for the last trip into a learned electric power consumption rate previously learned through electric power consumption rate learning operation. In the present embodiment, a latest learned electric power consumption rate is learned by $1/15$ smoothing. That is, where the learned electric power consumption rate previously learned through electric power consumption rate learning operation is REa, the trip electric power consumption rate obtained for the last trip is REb and the latest learned electric power consumption rate is REc, the latest learned electric power consumption rate REc is calculated by the following mathematical expression (1).

$$REc = (14 \times REa/15) + (REb/15) \tag{1}$$

This arithmetic expression indicates the case where electric power is consumed from the full charge (for example, SOC is 90%) of the battery 24 to a lower limit state of charge SOC (for example, 25%) at or above which the vehicle is able to travel in the CD mode. Therefore, when an actual electric power consumption is smaller than that in this case (in the above-described case, 65%), a final learned electric power consumption rate (latest learned electric power consumption rate) is obtained by decreasing the influence of the trip electric power consumption rate obtained for the last trip on the basis of that ratio. The value of the full charge and the value of the lower limit state of charge SOC are not limited to the above values.

Next, electric power consumption rate learning operation based on whether the engine is driven, which is a characteristic operation of the present embodiment, will be described. In the electric power consumption rate learning operation, in a situation that a learned electric power consumption rate is learned in accordance with the above-described basic operation of learning an electric power consumption rate, whether to validate or invalidate a trip electric power consumption rate in a current trip (actually, whether to validate or invalidate information (an electric power consumption and a travel distance) acquired in the trip) is changed on the basis of a driving condition (driving frequency; a driving time in the following first embodiment, the rate of a driving time in a second embodiment, and the number of times the engine is driven) of the engine 2 in the CD mode. Hereinafter, the embodiments will be described.

First, the first embodiment will be described. In the first embodiment, when the driving time of the engine 2 in the CD mode is longer than or equal to a predetermined period of time, even though information about an electric power consumption and a travel distance is not acquired during the driving time of the engine 2, it is determined that an obtained trip electric power consumption rate may have an error, and the trip electric power consumption rate is invalidated (acquired information about an electric power consumption and a travel distance is invalidated).

Figure 7A:
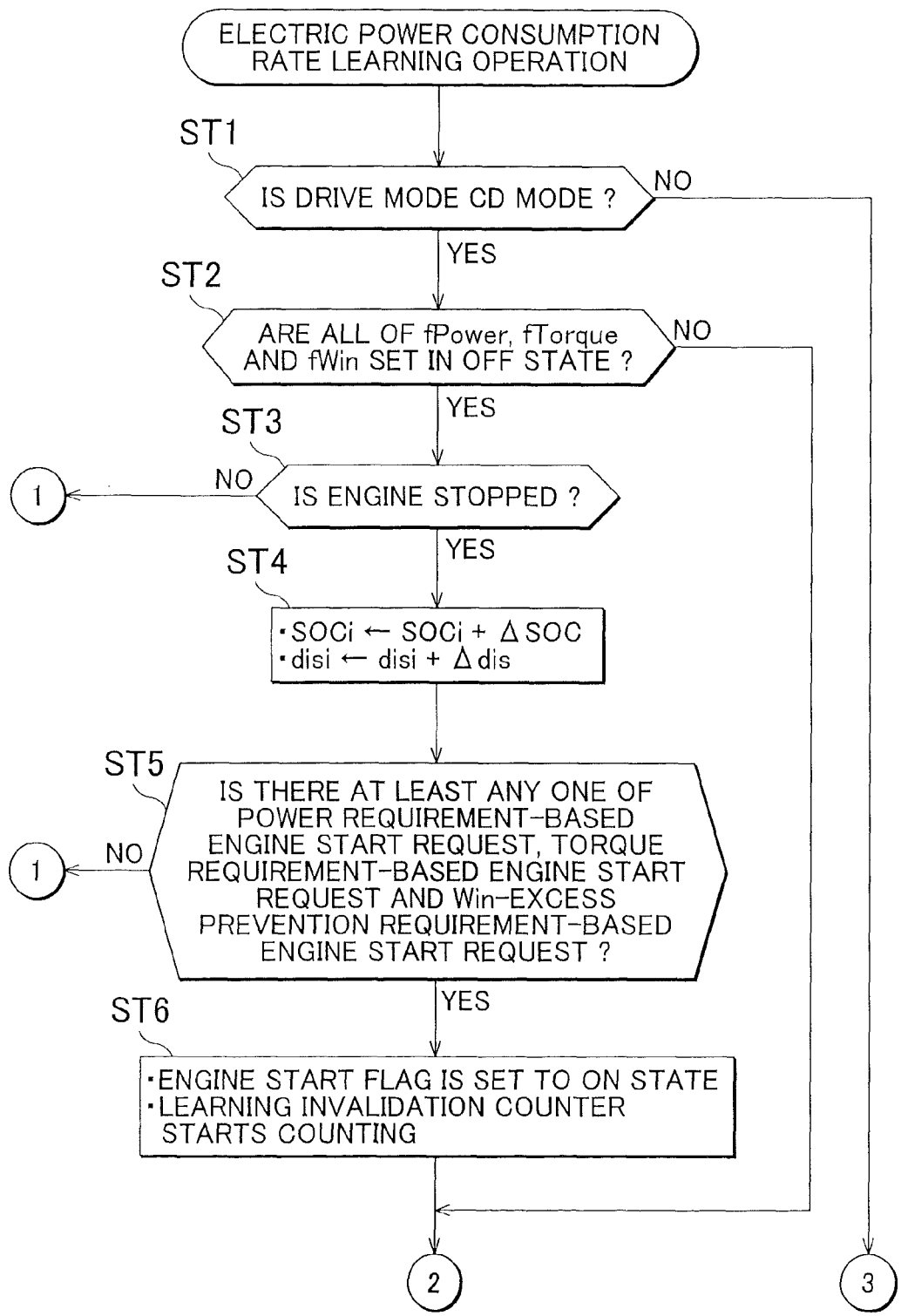
FIG. 7A and FIG. 7B are flowcharts that show the procedure of electric power consumption rate learning operation according to a first embodiment of the invention.
Figure 7B:
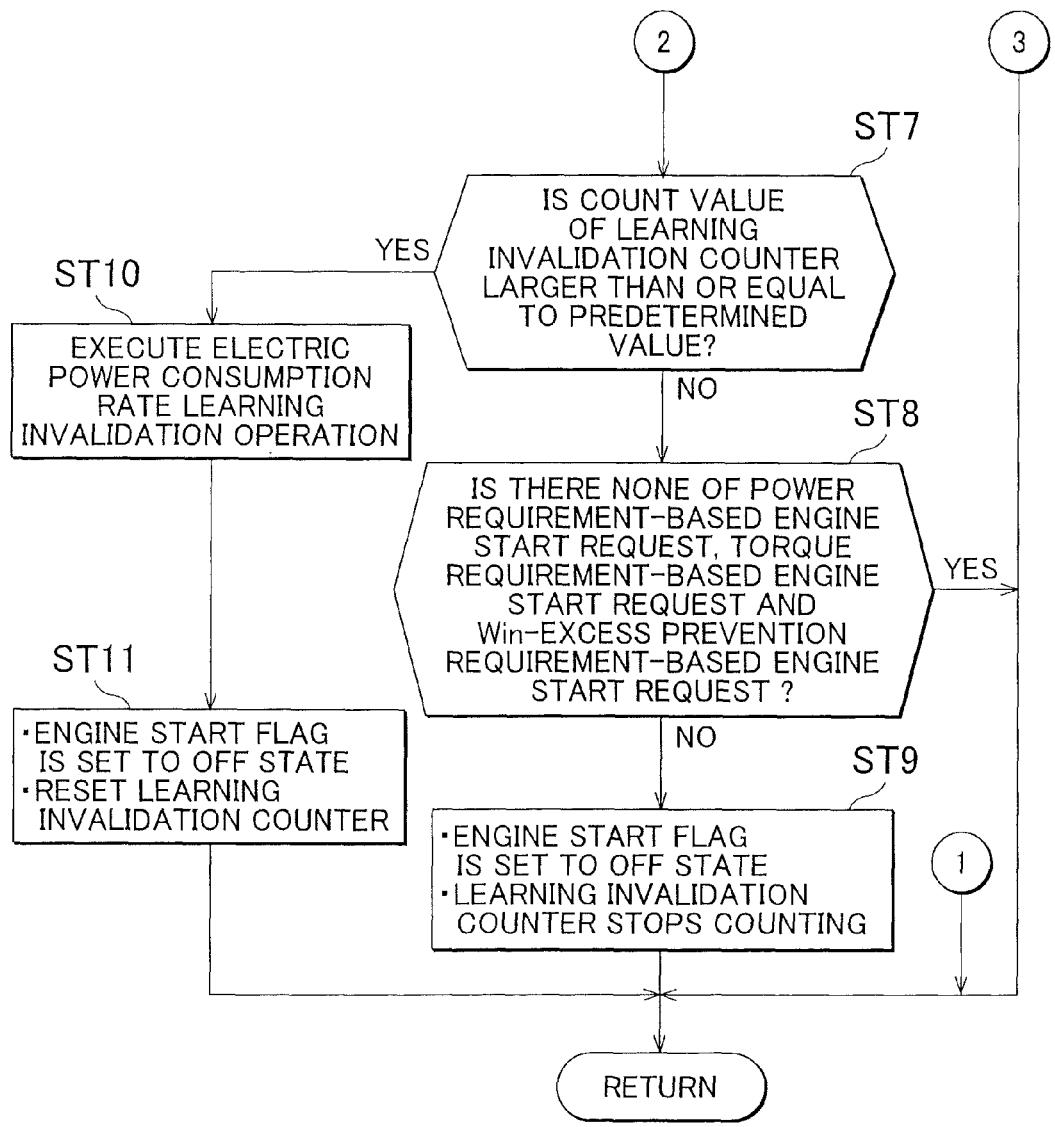

Hereinafter, an example operation of learning an electric power consumption rate on the basis of whether the engine is driven will be described with reference to the flowcharts shown in FIGS. 7A and 7B. The flowcharts shown in FIGS. 7A and 7B show an operation of accumulating an electric power consumption and a travel distance in one trip. That is, when information about an electric power consumption and a travel distance is determined to be valid through the flowchart, these pieces of information are stored in the backup RAM 43, a trip electric power consumption rate is calculated and a learned electric power consumption rate is calculated at the time of next charging (plug-in charging) from the external power supply OE. The flowcharts shown in FIGS. 7A and 7B are repeatedly executed at predetermined time intervals (for example, intervals of several milliseconds) while the plug-in hybrid vehicle 1 is travelling.

First, in step ST1, it is determined whether the current drive mode of the plug-in hybrid vehicle 1 is the CD mode. This determination is made on the basis of whether the state of charge SOC of the battery 24 is larger than or equal to the threshold.

When the drive mode is not the CD mode and negative determination is made in step ST1, that is, when the drive mode is the CS mode, the process is returned without learning an electric power consumption rate (without learning an electric power consumption rate because the vehicle 1 preferentially travels on both the power of the engine 2 and the power of the second motor generator MG2).

When the drive mode is the CD mode and affirmative determination is made in step ST1, the process proceeds to step ST2. In step ST2, it is determined whether a power requirement-based engine start flag fPower, a torque requirement-based engine start flag fTorque and a Win-excess prevention requirement-based engine start flag fWin all are set to an off state. The power requirement-based engine start flag fPower is a flag that is set to an on state when the engine 2 is started in order to satisfy a required power. The torque requirement-based engine start flag fTorque is a flag that is set to an on state when the engine 2 is started in order to satisfy a required torque. The Win-excess prevention requirement-based engine start flag fWin is a flag that is set to an on state when the first motor generator MG1 is driven in order to subject the engine 2 to motoring due to occurrence of the Win limitation.

The power requirement-based engine start flag fPower and the torque requirement-based engine start flag fTorque are generally set to an on state while the vehicle is travelling on an uphill, so, when at least one of these flags is in an on state, it may be regarded that the vehicle is currently travelling on an uphill; whereas, when these flags both are in an off state, it may be regarded that the vehicle is currently travelling on a downhill or travelling on a road surface having a relatively small gradient.

The Win-excess prevention requirement-based engine start flag fWin is generally set to an on state (set to an on state when the Win limitation is started) when the vehicle has continuously traveled on a downhill, so when the flag is in an on state, it may be regarded that the vehicle is currently travelling on a downhill; whereas, when the flag is in an off state, it may be regarded that the vehicle is currently travelling on an uphill or travelling on a road surface having a relatively small gradient.

Therefore, when these engine start flags fPower, fTorque and fWin all are in an off state, it may be regarded that the vehicle is currently travelling on a road surface having a relatively small gradient.

When the drive mode is the CD mode and the accelerator operation amount is smaller than or equal to a predetermined operation amount (in the case of an operation region smaller than or equal to the engine start power line in the CD mode, shown in FIG. 6) or when the Win limitation has not occurred, there is no request for engine start (including the case where the crankshaft 2a is rotated by driving the first motor generator MG1), and, because the flags all are in an off state, affirmative determination is made in step ST2, after which the process proceeds to step ST3.

In step ST3, it is determined whether the engine 2 is currently stopped. That is, even when the engine start flags fPower, fTorque and fWin all are in an off state, the engine 2 may be driven for another request (for example, a request to warm up the engine 2 or a charging request in the case where the state of charge SOC of the battery 24 is low), so it is determined in step ST3 whether the engine 2 is stopped without any engine start request.

When the engine 2 is driven, negative determination is made in step ST3, and the process is returned without acquiring information (an electric power consumption and a travel distance) for calculating a trip electric power consumption rate. As in the case of the related art, this is an operation not to acquire information for calculating a trip electric power consumption rate while the engine 2 is being driven.

On the other hand, when the engine 2 is stopped and affirmative determination is made in step ST3, the process proceeds to step ST4. In step ST4, information about an electric power consumption and a travel distance (information for calculating a trip electric power consumption rate) in the current routine is acquired, and the electric power consumption and the travel distance in the current trip are accumulated.

Specifically, where an accumulated value of the electric power consumption up to the last routine is SOCi ("0" at the time of the start of trip) and the electric power consumption (the amount of reduction in the state of charge SOC in the current routine with respect to the state of charge SOC in the last routine) acquired in the current routine is $\Delta$SOC, the accumulated value SOCi of the electric power consumption is updated by the following mathematical expression (2).

$$SOCi \leftarrow SOCi + \Delta SOC \tag{2}$$

Where an accumulated value of the travel distance up to the last routine is disi ("0" at the time of the start of trip) and the travel distance (the amount of increase in the travel distance in the current routine with respect to the travel distance in the last routine) acquired in the current routine is $\Delta$dis, the accumulated value disi of the travel distance is updated by the following mathematical expression (3).

$$disi \leftarrow disi + \Delta dis \tag{3}$$

After the accumulated value (SOCi) of the electric power consumption and the accumulated value (disi) of the travel distance are updated, the process proceeds to step ST5. In step ST5, it is determined whether there is at least one of the engine start requests, that is, the power requirement-based engine start request (engine start request for satisfying a required power), the torque requirement-based engine start request (engine start request for satisfying a required torque) and the Win-excess prevention requirement-based engine start request (engine start request for driving the first motor generator MG1 in order to subject the engine 2 to motoring due to occurrence of the Win limitation). Determination as to the power requirement-based engine start request and the torque requirement-based engine start request is made by applying the accelerator operation amount to the map of FIG. 6 and then determining whether the operation region falls within an engine drive region (region in which the required power is higher than the engine start power line in the CD mode). Determination as to the Win-excess prevention requirement-based engine start request is made by detecting the regenerative state of the second motor generator MG2 and the state of charge SOC of the battery 24.

When there is none of those engine start requests and negative determination is made in step ST5, the process is directly returned. Therefore, until there occurs any of the engine start requests in the CD mode, the operations of step ST1 to step ST5 are repeated, and the accumulated value (SOCi) of the electric power consumption and the accumulated value (disi) of the travel distance are updated by the mathematical expressions (2) and (3) in each routine. Therefore, when a trip ends without any of those engine start requests and next charging operation is performed, the trip electric power consumption rate (electric power consumption rate in an immediately preceding trip) is calculated using the updated accumulated value of the electric power consumption and the updated accumulated value of the travel distance in the operation to calculate the trip electric power consumption rate.

On the other hand, when there is at least any one of the power requirement-based engine start request, the torque requirement-based engine start request and the Win-excess prevention requirement-based engine start request and affirmative determination is made in step ST5, the process proceeds to step ST6. In step ST6, the engine start flag is set to an on state, and a learning invalidation counter provided in the hybrid ECU 10 starts counting (incrementing). The engine start flag here is the power requirement-based engine start flag fPower, the torque requirement-based engine start flag fTorque or the Win-excess prevention requirement-based engine start flag fWin. When the engine 2 is started in order to satisfy a required power (start of the engine 2 as a result of travelling on an uphill), the power requirement-based engine start flag fPower is set to an on state. When the engine 2 is started in order to satisfy a required torque (start of the engine 2 as a result of travelling on an uphill); the torque requirement-based engine start flag fTorque is set to an on state. When the engine 2 is started in order to prevent an excess of Win (start of the engine 2 as a result of travelling on a downhill), the Win-excess prevention requirement-based engine start flag fWin is set to an on state. The learning invalidation counter counts up when a count value reaches a predetermined count value (for example, several tens of seconds).

After at least any one of the engine start flags is set to an on state in this way and the learning invalidation counter starts counting, the process proceeds to step ST7. In step ST7, it is determined whether the count value of the learning invalidation counter has reached a predetermined value or above. Immediately after the learning invalidation counter starts counting in step ST6, the count value of the learning invalidation counter has not reached the predetermined value, so negative determination is made in step ST7, and the process proceeds to step ST8.

In step ST8, it is determined whether there is none of the power requirement-based engine start request, the torque requirement-based engine start request and the Win-excess prevention requirement-based engine start request (there is none of the engine start requests).

When there is at least one of the power requirement-based engine start request, the torque requirement-based engine start request and the Win-excess prevention requirement-based engine start request, affirmative determination is made in step ST8, and the process is returned. In this case, at least one of the engine start requests is maintained and at least one engine start flag is in an on state, so, in the CD mode (when affirmative determination is made in step ST1), negative determination is made in step ST2, and the process proceeds to the operation of step ST7. That is, it is determined whether the continuously counted count value of the learning invalidation counter has reached the predetermined value or above without acquiring information about an electric power consumption and a travel distance or accumulating these electric power consumption and travel distance in step ST4. That is, the learning invalidation counter has continued counting without acquiring information about an electric power consumption and a travel distance such that a travel in this state (a travel in a state where the engine 2 is being driven) is not incorporated into the trip electric power consumption rate, and, in step ST7, it is determined whether the count value of the learning invalidation counter has reached the predetermined value or above. That is, in a period during which any one of the engine start flags is set to an on state, the learning invalidation counter continues counting.

When all of the power requirement-based engine start request, the torque requirement-based engine start request and the Win-excess prevention requirement-based engine start request disappear before the count value of the learning invalidation counter reaches the predetermined value (before affirmative determination is made in step ST7), negative determination is made in step ST8, and the process proceeds to step ST9. Then, the engine start flags are set to an off state, and the learning invalidation counter stops counting. In this case, the count value of the learning invalidation counter is not reset, but the count value at the present time point is kept (held).

When the engine start flags are set to an off state in this way, in the next routine, affirmative determination is made in step ST2 again on the condition that the drive mode is the CD mode (affirmative determination is made in step ST1). When the engine 2 is stopped (when the engine 2 is not driven in response to another request and affirmative determination is made in step ST3), the above-described information about an electric power consumption ($\Delta$SOC) and a travel distance ($\Delta$dis) in the current routine is acquired and the electric power consumption (SOCi) and the travel distance (disi) are accumulated in step ST4. That is, because the plug-in hybrid vehicle 1 is currently travelling by only the driving force of the second motor generator MG2 in the CD mode, a period in this driving state is set as the period during which information for calculating a trip electric power consumption rate is acquired, and then information about an electric power consumption and a travel distance is acquired. The above operations are continued until there occurs any one of the above-described engine start requests (at least one of the power requirement-based engine start request, the torque requirement-based engine start request and the Win-excess prevention requirement-based engine start request) again (until affirmative determination is made in step ST5) or until the engine 2 is driven in response to another request (until negative determination is made in step ST3).

On the other hand, in a situation that there is at least any one of the power requirement-based engine start request, the torque requirement-based engine start request and the Win-excess prevention requirement-based engine start request and the learning invalidation counter continues counting (incrementing for each routine), when the count value of the learning invalidation counter reaches the predetermined value or above before all the power requirement-based engine start request, the torque requirement-based engine start request and the Win-excess prevention requirement-based engine start request disappear (before negative determination is made in step ST8) and then affirmative determination is made in step ST7, the process proceeds to step ST10. In step ST10, as a result of the fact that the count value of the learning invalidation counter has reached the predetermined value or above, electric power consumption rate learning invalidation operation is executed. Specifically, the accumulated value (SOCi) of the electric power consumption and the accumulated value (disi) of the travel distance, which have been calculated in step ST4, both are invalidated (cleared). By so doing, the trip electric power consumption rate is not calculated in the current trip, and the accumulated value of the electric power consumption and the accumulated value of the travel distance are not incorporated into learning of an electric power consumption rate. That is, in the current trip, even though the driving time of the engine 2 is relatively long and information about an electric power consumption and a travel distance is not acquired during the driving time of the engine 2 (even when information about an electric power consumption and a travel distance is acquired only during a stop of the engine 2), it is determined that a trip electric power consumption rate to be obtained may still have an error, so information in that trip is invalidated, and is not incorporated into the learned electric power consumption rate.

After that, the process proceeds to step ST11, the engine start flags are set to an off state, and the learning invalidation counter is reset (the count value is set at "0").

Through repetition of the above-described operations, when the driving time of the engine 2 in a trip exceeds the predetermined period of time, it is determined that the relationship between an electric power consumption and a travel distance, acquired in that trip, is not appropriate (which may cause an error in the trip electric power consumption rate), and the acquired relationship is invalidated.

Figure 8:
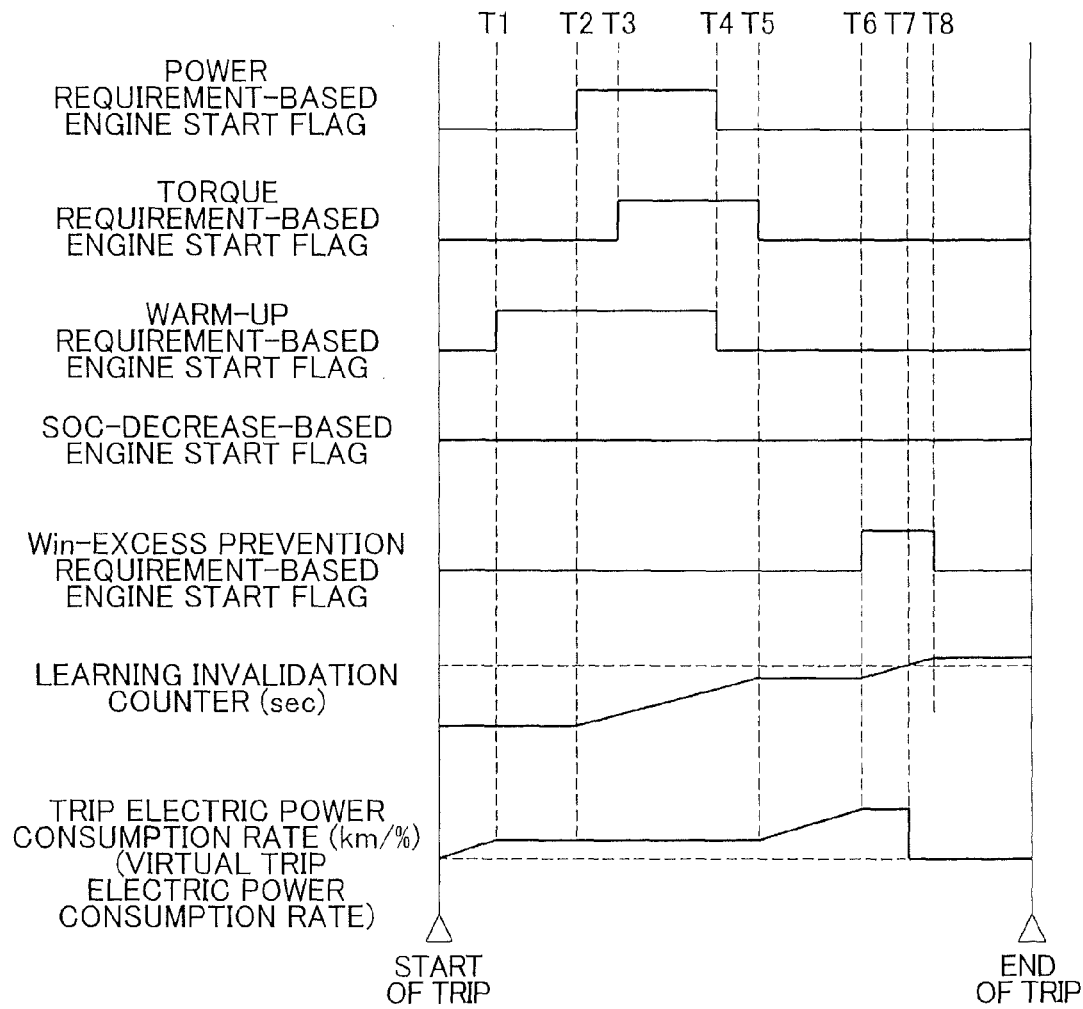
FIG. 8 is a timing chart that shows variations in engine start flags, a learning invalidation counter and a trip electric power consumption rate according to the first embodiment of the invention.

FIG. 8 is a timing chart that shows variations in the engine start flags, the learning invalidation counter and the trip electric power consumption rate in the above-described electric power consumption rate learning operation based on whether the engine is driven. In FIG. 8, the engine start flags not only include the above-described "power requirement-based engine start flag", "torque requirement-based engine start flag" and "Win-excess prevention requirement-based engine start flag" but also a "warm-up requirement-based engine start flag" and an SOC-decrease-based engine start flag". The "warm-up requirement-based engine start flag" is set to an on state during warm-up operation of the engine 2 when the engine 2 is cold, for example. The "SOC-decrease-based engine start flag" is set to an on state at the time when electric power is generated by the first motor generator MG1 using the power of the engine 2 when the state of charge SOC of the battery 24 is low. The learning invalidation counter is not incremented when the "warm-up requirement-based engine start flag" or the "SOC-decrease-based engine start flag" is set to an on state. This is because these engine start flags do not correlate (or just slightly correlates) with a road surface gradient and it is less likely to cause the error due to the fact that one of these flags is in an on state.

As described above, the trip electric power consumption rate is calculated by dividing the stored accumulated value of the travel distance by the stored accumulated value of the electric power consumption at the time of charging (when the connector 91 is connected to the inlet 28) after a trip. In FIG. 8, for the sake of easy understanding, a value in the case where it is assumed that the trip electric power consumption rate (the trip electric power consumption rate up to the present time point) is calculated while travelling in the CD mode is shown as the trip electric power consumption rate at the bottom row. Hereinafter, the trip electric power consumption rate shown here is termed "virtual trip electric power consumption rate".

In FIG. 8, the period from the timing T2 to the timing T5 corresponds to a period during which the vehicle is travelling on an uphill, and the period from the timing T5 to the timing T8 corresponds to a period during which the vehicle is travelling on a downhill.

When charging of the battery 24 has been completed and a trip is started, the warm-up requirement-based engine start flag is initially set to an on state at the timing T1, and the engine 2 is started. Therefore, in a vehicle travel period up to the timing T1, the engine 2 is stopped (the vehicle is travelling by only the driving force of the second motor generator MG2), and an electric power consumption and a travel distance are being accumulated (step ST4). In FIG. 8, the virtual trip electric power consumption rate in this period (period up to the timing T1) increases as the vehicle 1 travels.

At the timing T1 at which the warm-up requirement-based engine start flag is set to an on state, acquiring information about an electric power consumption and a travel distance is stopped as a result of a start of the engine 2. Therefore, the virtual trip electric power consumption rate is constant. In this case, the learning invalidation counter does not increment (the learning invalidation counter does not increment because negative determination is made in step ST5).

At the timing T2, there occurs the power requirement-based engine start request (affirmative determination is made in step ST5), and the power requirement-based engine start flag is set to an on state. As the engine start flag is set to an on state, the learning invalidation counter starts counting (step ST6). Because the engine 2 is continuously driven, acquiring information about an electric power consumption and a travel distance is stopped. After that, there occurs the torque requirement-based engine start request and the torque requirement-based engine start flag is also set to an on state (timing T3); however, the learning invalidation counter has been already started counting, so, even when the torque requirement-based engine start flag is set to an on state, it does not influence the counting operation of the learning invalidation counter.

After that, at the timing T4, the power requirement-based engine start request disappears and the power requirement-based engine start flag is set to an off state, and the warm-up request also disappears and the warm-up requirement-based engine start flag is also set to an off state. However, the torque requirement-based engine start request is still maintained and the torque requirement-based engine start flag is in an on state, so acquiring information about an electric power consumption and a travel distance is stopped, and the learning invalidation counter continues counting (the learning invalidation counter continues counting because negative determination is made in step ST2).

At the timing T5, the torque requirement-based engine start request disappears, and the torque requirement-based engine start flag is set to an off state. By so doing, the power requirement-based engine start flag and the torque requirement-based engine start flag both are in an off state, so the learning invalidation counter stops counting (step ST9). In addition, at the timing T5, the warm-up requirement-based engine start flag is also in an off state, so the engine 2 is stopped accordingly, and acquiring information about an electric power consumption and a travel distance is started (step ST4). In FIG. 8, the virtual trip electric power consumption rate increases as the vehicle 1 travels in a period from the timing T5 to the timing T6 (described later).

At the timing T6, there occurs the Win-excess prevention requirement-based engine start request (affirmative determination is made in step ST5) because the vehicle 1 has continuously traveled on a downhill, and the Win-excess prevention requirement-based engine start flag is set to an on state. As this engine start flag is set to an on state, the learning invalidation counter starts counting (step ST6). In addition, acquiring information about an electric power consumption and a travel distance is stopped as a result of a start of the engine 2, and the virtual trip electric power consumption rate becomes constant.

The count value of the learning invalidation counter reaches the predetermined value at the timing T7 (affirmative determination is made in step ST7), and the electric power consumption rate learning invalidation operation is executed (step ST10). That is, the calculated accumulated value of the electric power consumption and the calculated accumulated value of the travel distance are invalidated. In FIG. 8, at the timing T7, the trip electric power consumption rate is returned to an initial value (the trip electric power consumption rate at the time point at which the current trip is started).

After that, at the timing T8, the Win-excess prevention requirement-based engine start request disappears, and the Win-excess prevention requirement-based engine start flag is set to an off state. However, the electric power consumption rate learning invalidation operation has been already executed in the current trip, the trip electric power consumption rate is kept at the initial value.

As described above, in the present embodiment, when the driving frequency in the case where the engine 2 is driven as the vehicle 1 travels on an uphill and a downhill is higher than a preset predetermined frequency, information acquired for calculating a trip electric power consumption rate is invalidated. By so doing, a calculated trip electric power consumption rate that includes an error is not incorporated into learning of an electric power consumption rate. As a result, it is possible to maintain the high accuracy of a learned value of an electric power consumption rate.

In the present embodiment, when the driving time of the engine 2 is longer than or equal to the predetermined period of time, the electric power consumption rate learning invalidation operation is executed. Therefore, during a trip, it is possible to execute the electric power consumption rate learning invalidation operation (when the driving time of the engine 2 is longer than or equal to the predetermined period of time), after that, it is not required to acquire information about an electric power consumption and a travel distance. As a result, it is possible to avoid unnecessary information acquisition operation.

Next, a second embodiment will be described. In the present embodiment, when the rate of the driving time of the engine 2 in the CD mode is higher than or equal to a predetermined value, even though information about an electric power consumption and a travel distance is not acquired during the driving time of the engine 2, it is determined that an obtained trip electric power consumption rate may have an error, and the trip electric power consumption rate learning operation in that trip is invalidated.

In the present embodiment, the count value of the learning invalidation counter according to the first embodiment is replaced with the rate of the driving time of the engine 2 in a trip. That is, the rate of the driving time of the engine 2 (the driving time of the engine 2 in response to the power requirement-based engine start request, the driving time of the engine 2 in response to the torque requirement-based engine start request and the driving time of the engine 2 in response to the Win-excess prevention requirement-based engine start request) with respect to the total time of the trip at the end of the trip reaches a predetermined rate, an accumulated value of the electric power consumption and an accumulated value of the travel distance, calculated in that trip, are invalidated.

Figure 9:
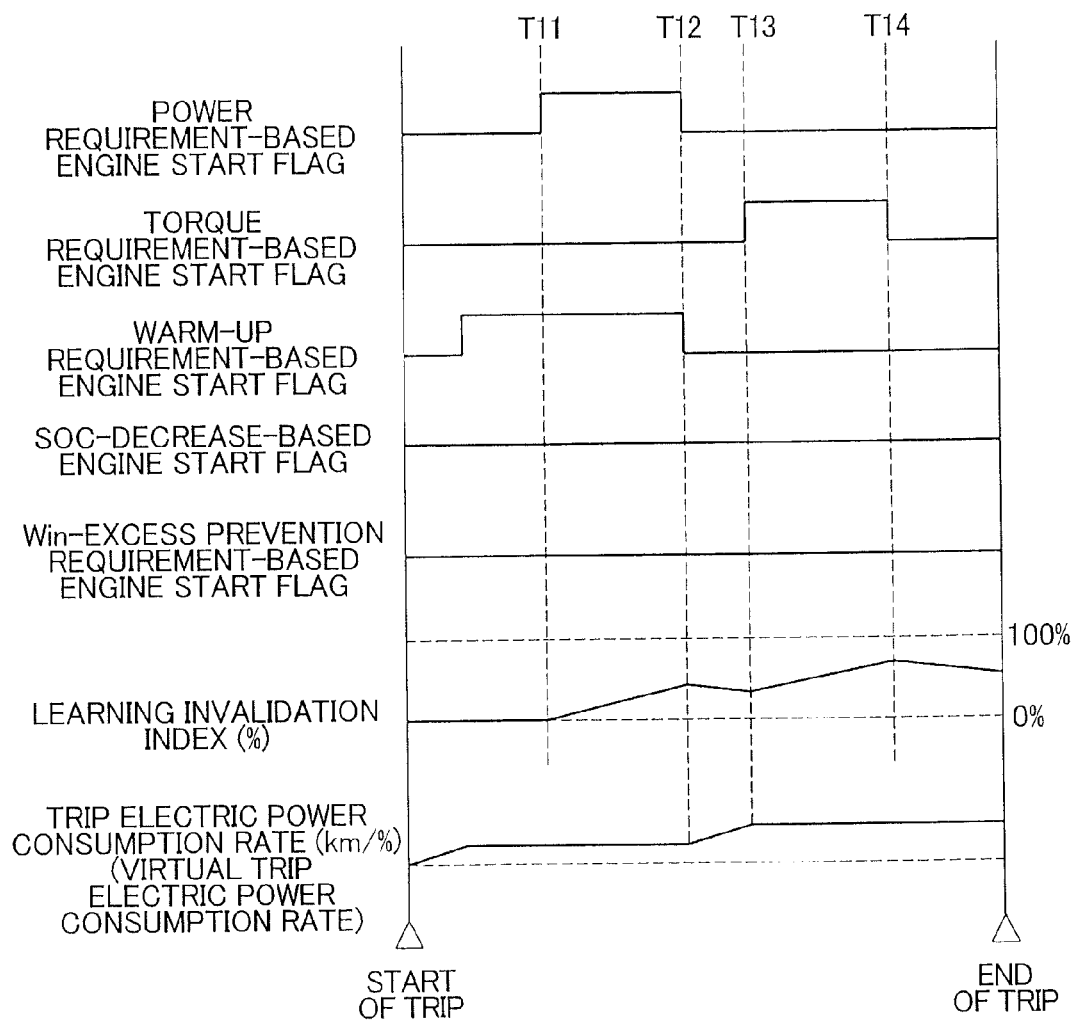
FIG. 9 is a timing chart that shows variations in engine start flags, a learning invalidation index and a trip electric power consumption rate according to a second embodiment of the invention.

FIG. 9 is a timing chart that shows variations in the engine start flags, a learning invalidation index (the rate of the driving time of the engine 2 as the vehicle travels on an uphill or a downhill in a trip) and a trip electric power consumption rate in the electric power consumption rate learning operation based on whether the engine is driven according to the present embodiment. Here, the difference from the timing chart shown in FIG. 8 in the first embodiment will be mainly described.

At the timing T11 in FIG. 9, there occurs the power requirement-based engine start request, and the power requirement-based engine start flag is set to an on state. As the engine start flag is set to an on state, the learning invalidation index increases. In addition, acquiring information about an electric power consumption and a travel distance is stopped.

At the timing T12, the power requirement-based engine start request disappears, and the power requirement-based engine start flag is set to an off state. Here, the power requirement-based engine start flag and the torque requirement-based engine start flag both are set to an off state, and the learning invalidation index decreases. In addition at the timing T12, the warm-up requirement-based engine start flag is also set to an off state, and, accordingly, the engine 2 is stopped, so acquiring information about an electric power consumption and a travel distance is started. In FIG. 9, in a period from the timing T12 to the timing T13 (described later), the virtual trip electric power consumption rate increases as the vehicle 1 travels.

At the timing T13, there occurs the torque requirement-based engine start request, and the torque requirement-based engine start flag is set to an on state. As the engine start flag is set to an on state, the learning invalidation index increases. In addition, acquiring information about an electric power consumption and a travel distance is stopped.

At the timing T14, the torque requirement-based engine start request disappears, and the torque requirement-based engine start flag is set to an off state. Here, the power requirement-based engine start flag and the torque requirement-based engine start flag both are set to an off state, and the learning invalidation index decreases. In addition, at the timing T14, the engine 2 is stopped, so acquiring information about an electric power consumption and a travel distance is started.

The learning invalidation index is extracted at the time point at which the trip ends, and, when the learning invalidation index exceeds a predetermined rate (for example, when the learning invalidation index exceeds 50%), the electric power consumption rate learning invalidation operation is executed. That is, the calculated accumulated value of the electric power consumption and the calculated accumulated value of the travel distance are invalidated. In FIG. 9, because the learning invalidation index at the trip end point exceeds the predetermined rate, the trip electric power consumption rate is returned to the initial value (the trip electric power consumption rate at the current trip start point) at the time point at which the trip ends. The rate of the learning invalidation index, which is a threshold for invalidating the accumulated value of the electric power consumption and the accumulated value of the travel distance, is not limited to the above-described value, and is set appropriately.

In the present embodiment, when the total travel time of one trip is relatively long, it is possible to properly determine whether to invalidate the accumulated value of the electric-power consumption and the accumulated value of the travel distance. That is, for example, even when the accumulated driving time of the engine 2 in one trip is relatively long, but when the total driving time of one trip extends over a long period of time, a period during which the engine 2 is stopped is also long (a period during which information that allows a trip electric power consumption rate to be properly calculated is long), so an error due to the fact that the engine 2 is driven relatively reduces. Therefore, in such a situation, it is desirable to learn a latest learned value of the electric power consumption rate by calculating a trip electric power consumption rate without invalidating the accumulated value of the electric power consumption and the accumulated value of the travel distance. In this way, when it is configured to make determination on the basis of the rate of the driving time of the engine 2 in one trip, the accumulated value of the electric power consumption and the accumulated value of the travel distance are not invalidated more than necessary.

Next, a third embodiment will be described. In the present embodiment, when the number of times the engine 2 is driven in the CD mode is larger than or equal to a predetermined number of times, even though information about an electric power consumption and a travel distance is not acquired during the driving time of the engine 2, it is determined that an obtained trip electric power consumption rate may have an error, and the trip electric power consumption rate is invalidated (acquired information about an electric power consumption and a travel distance is invalidated).

In the present embodiment, the count value (time) of the learning invalidation counter according to the first embodiment is replaced with the number of times the engine 2 is driven in a trip. That is, at the time point at which the number of times the engine 2 is driven in a trip has reached a predetermined number of times, the accumulated values of the electric power consumption and travel distance, accumulated in the trip, are invalidated.

Figure 10:
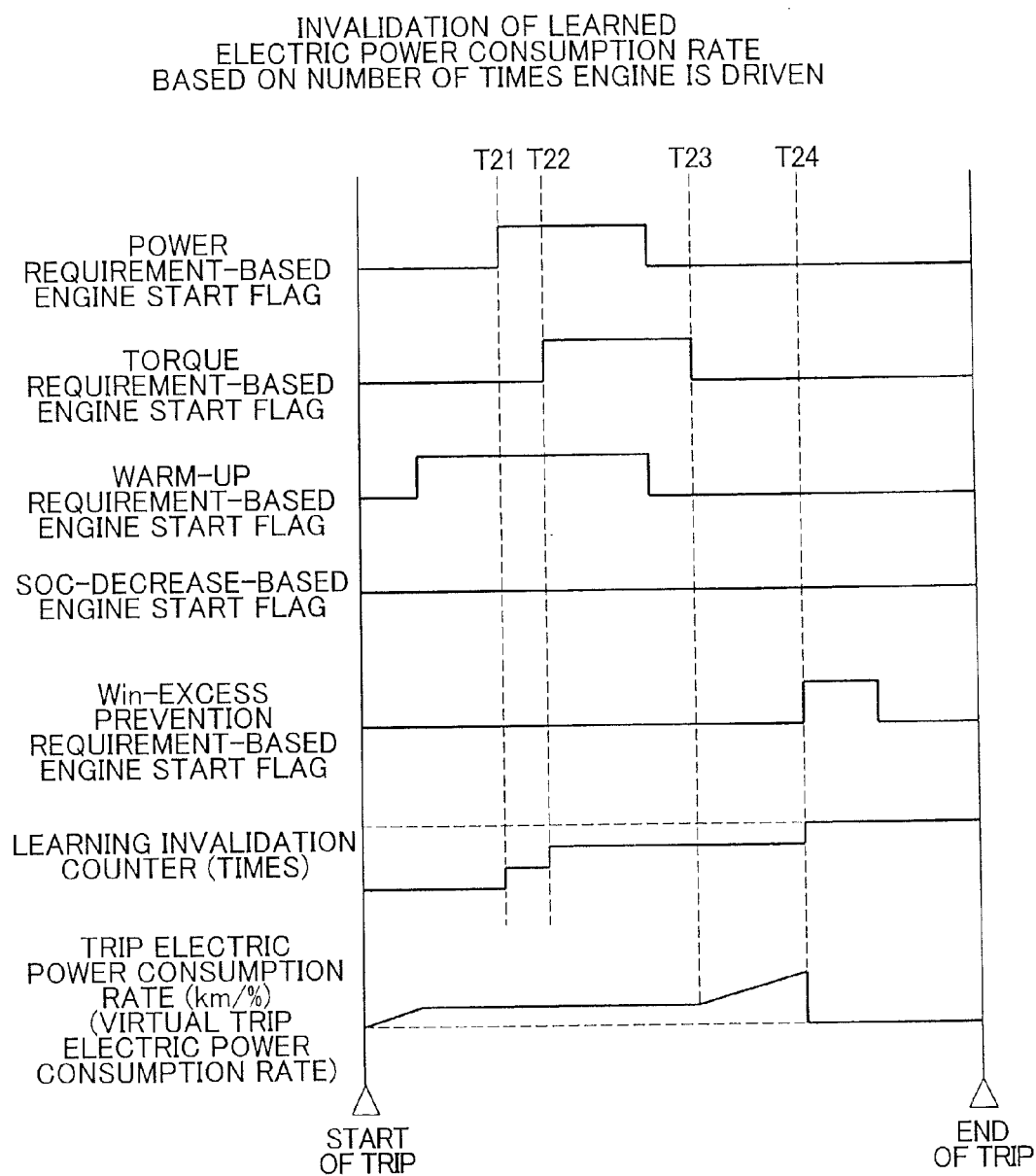
FIG. 10 is a timing chart that shows variations in engine start flags, a learning invalidation counter and a trip electric power consumption rate according to a third embodiment of the invention.
Figure 11:
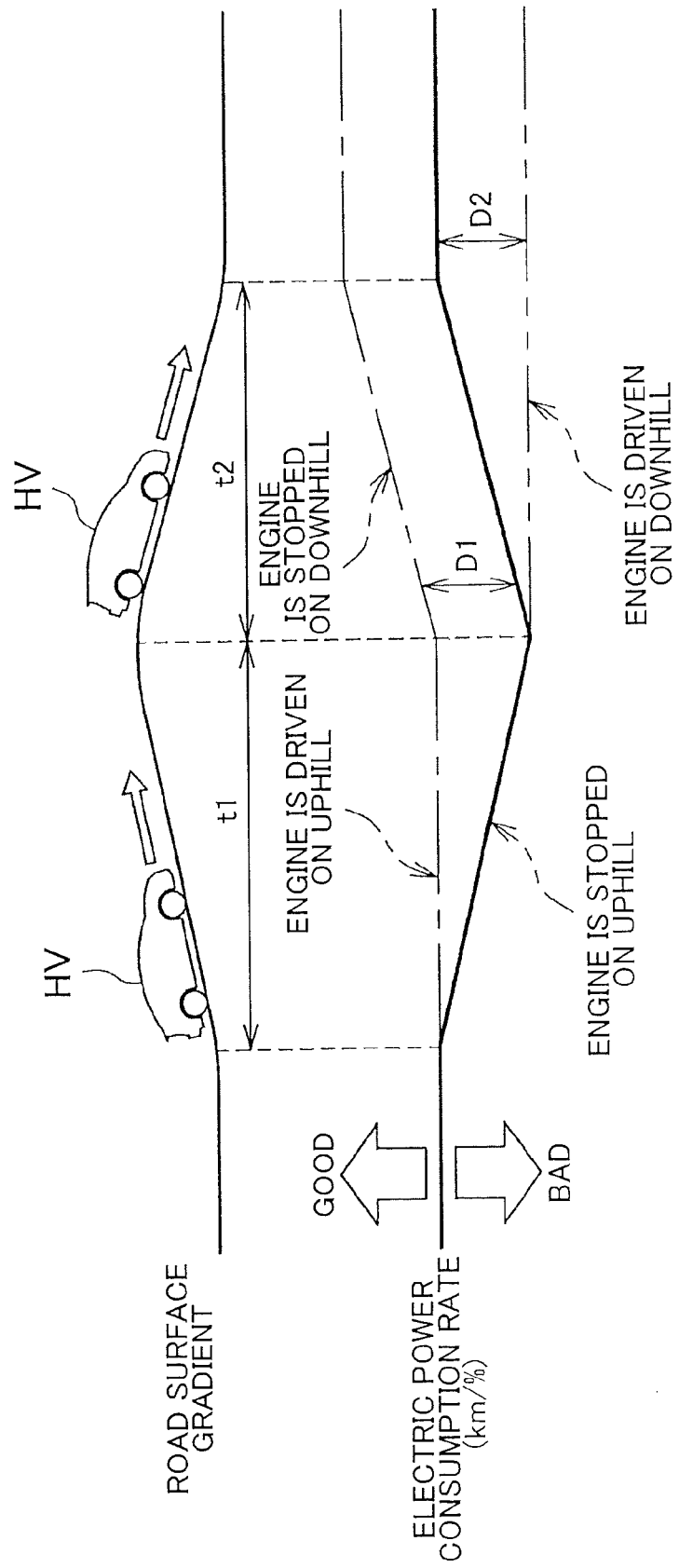
FIG. 11 is a view for illustrating a problem of a related art and is a view that shows a road surface gradient and a variation in electric power consumption rate during a vehicle travel in the case where a plug-in hybrid vehicle travels on an uphill and then travels on a downhill.

FIG. 10 is a timing chart that shows variations in the engine start flags, the learning invalidation counter and the trip electric power consumption rate in the electric power consumption rate learning operation based on whether the engine is driven according to the present embodiment. Here, the difference from the timing chart shown in FIG. 8 in the first embodiment will be mainly described.

At the timing T21 in FIG. 10, there occurs the power requirement-based engine start request, and the power requirement-based engine start flag is set to an on state. As this engine start flag is set to an on state, the learning invalidation counter is incremented. In addition, acquiring information about an electric power consumption and a travel distance is stopped.

At the timing T22, there occurs the torque requirement-based engine start request, and the torque requirement-based engine start flag is set to an on state. At this time as well, as the engine start flag is set to an on state, the learning invalidation counter is incremented. Acquiring information about an electric power consumption and a travel distance is continuously stopped.

At the timing T23, the torque requirement-based engine start request disappears, and the torque requirement-based engine start flag is set to an off state. The power requirement-based engine start request has already disappeared, and the power requirement-based engine start flag is in an off state. Accordingly, the engine 2 stops, and acquiring information about an electric power consumption and a travel distance is started. In FIG. 10, the virtual trip electric power consumption rate increases as the vehicle 1 travels in a period from the timing T23 to the timing T24 (described later).

At the timing T24, there occurs the Win-excess prevention requirement-based engine start request, and the Win-excess prevention requirement-based engine start flag is set to an on state. As the engine start flag is set to an on state, the learning invalidation counter is incremented.

Through the increment of the learning invalidation counter, the learning invalidation counter reaches the predetermined value, and the electric power consumption rate learning invalidation operation is executed. That is, the calculated accumulated value of the electric power consumption and the calculated accumulated value of the travel distance are invalidated. In FIG. 10, at the timing T24, the trip electric power consumption rate is returned to an initial value (the trip electric power consumption rate at the time point at which the current trip is started).

In the present embodiment, when the number of times the engine 2 is driven becomes larger than or equal to the predetermined number of times, the electric power consumption rate learning invalidation operation is executed. Therefore, as in the case of the first embodiment, during a trip, it is possible to execute the electric power consumption rate learning invalidation operation (when the number of times the engine 2 is driven is larger than or equal to the predetermined number of times), after that, it is not required to acquire information about an electric power consumption and a travel distance. As a result, it is possible to avoid unnecessary information acquisition operation.

Hereinafter, alternative embodiments will be described. In the above-described first and second embodiments, the description is made on an example in which the invention is applied to control over the front-engine front-drive (FF) plug-in hybrid vehicle 1; however, the invention is not limited to this configuration. Instead, the invention may be applied to control over a front-engine rear-drive (FR) plug-in hybrid vehicle or a four-wheel-drive plug-in hybrid vehicle.

In the above-described embodiments, the description is made on an example in which the invention is applied to control over the plug-in hybrid vehicle 1 on which two motor generators, that is, the first motor generator MG1 and the second motor generator MG2, are mounted. Instead, the invention may also be applied to control over a plug-in hybrid vehicle on which a single motor generator is mounted or a plug-in hybrid vehicle on which three or more motor generators are mounted.

In the above-described embodiments, the drive mode is changed between the CD mode in which the vehicle preferentially travels on only the power of the second motor generator MG2 (the engine is stopped) and the CS mode in which the vehicle preferentially travels on both the power of the engine 2 and the power of the second motor generator MG2. That is, in any drive mode, there are a driving state where the vehicle travels on only the power of the second motor generator MG2 and a driving state where the vehicle travels on both the power of the engine 2 and the power of the second motor generator MG2. The invention is not limited to this configuration. Instead, the invention may also be applied to a plug-in hybrid vehicle that does not have these modes and that changes between a driving state where the vehicle travels on only the power of the second motor generator MG2 and a driving state where the vehicle travels on both the power of the engine 2 and the power of the second motor generator MG2 simply on the basis of a required driving force, and the like. In this case, on the basis of the frequency of the driving state where the vehicle travels on both the power of the engine 2 and the power of the second motor generator MG2 (the driving time of the engine 2, the rate of the driving time of the engine 2, the number of times the engine 2 is driven), when the frequency of the driving state exceeds a predetermined frequency, the trip electric power consumption rate is invalidated.

In the above-described embodiments, when the driving frequency of the engine 2 is high, the calculated accumulated value of the electric power consumption and the calculated accumulated value of the travel distance are invalidated. This is because, in a trip, an electric power consumption and a travel distance each are accumulated and, at the time of the start of next charging, a trip electric power consumption rate is calculated and an electric power consumption rate is learned. Instead, in a trip, in the case where a trip electric power consumption rate is sequentially calculated while an electric power consumption and a travel distance each are accumulated, when the driving frequency of the engine 2 is high, the calculated trip electric power consumption rate is invalidated or a learned value of the electric power consumption rate, learned in the trip, is returned to a value before the start of the trip.

In the above-described embodiments, the learning invalidation counter (learning invalidation index) is increased (incremented) both when the engine 2 is driven as the vehicle travels on an uphill and when the engine 2 is driven as the vehicle travels on a downhill. However, applying the invention to only one of when the engine 2 is driven as the vehicle travels on an uphill and when the engine 2 is driven as the vehicle travels on a downhill is also included in the scope of the technical idea of the invention.

The invention is applicable to control for calculating an electric power consumption rate in a plug-in hybrid vehicle and calculating a distance-to-empty from a remaining level of a battery.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A plug-in hybrid vehicle comprising:
an internal combustion engine that outputs driving-power;
an electric motor that outputs driving power;
an electrical storage device that stores electric power; and
a controller that is configured
to learn an electric power consumption rate by calculating the electric power consumption rate in the case where the vehicle has traveled on the electric power stored in the electrical storage device with the use of only the electric motor as a driving force source, and
to control travel of the plug-in hybrid vehicle with the use of at least one of the internal combustion engine and the electric motor as the driving force source,
the controller being further configured to, when a driving frequency of the internal combustion engine that is driven as the vehicle travels on at least one of an uphill and a downhill is higher than a predetermined frequency, invalidate the calculated electric power consumption rate or information acquired to calculate the electric power consumption rate.

2. The plug-in hybrid vehicle according to claim 1, wherein the controller is configured to determine whether the plug-in hybrid vehicle is travelling on the uphill or the downhill on the basis of whether there is any one of a power requirement, a torque requirement and a limit requirement of the plug-in hybrid vehicle, in response to which the internal combustion engine is operated in order to satisfy a driving request of the plug-in hybrid vehicle, the limit requirement being based on a maximum allowable electric power at or below which charging of the electrical storage device is allowed.

3. The plug-in hybrid vehicle according to claim 1, wherein the electrical storage device is chargeable from an external power supply, and the controller is configured to learn the electric power consumption rate by incorporating an electric power consumption rate calculated on the basis of an electric power consumption and a travel distance in a period during which the vehicle has traveled with the use of only the electric motor as the driving force source in a period from when the electrical storage device has been charged from the external power supply and then the vehicle has traveled to when the electrical storage device is charged from the external power supply next time.

4. The plug-in hybrid vehicle according to claim 1, wherein the controller is configured to calculate a distance-to-empty in the case where the vehicle travels with the use of only the electric motor as the driving force source by multiplying the learned electric power consumption rate by a remaining state of charge of the electrical storage device.

5. The plug-in hybrid vehicle according to claim 1, wherein the driving frequency in the case where the internal combustion engine is driven is an accumulated driving time of the internal combustion engine, and the controller is configured to, when the accumulated driving time of the internal combustion engine is longer than a predetermined accumulated period of time, invalidate the calculated electric power consumption rate or the information acquired to calculate the electric power consumption rate.

6. The plug-in hybrid vehicle according to claim 1, wherein the driving frequency in the case where the internal combustion engine is driven is a rate of an accumulated driving time of the internal combustion engine with respect to a total travel time in one trip, and the controller is configured to, when the rate of the accumulated driving time of the internal combustion engine is higher than a predetermined rate, invalidate the calculated electric power consumption rate or the information acquired to calculate the electric power consumption rate.

7. The plug-in hybrid vehicle according to claim 1, wherein the driving frequency in the case where the internal combustion engine is driven is the number of times the internal combustion engine is driven, and the controller is configured to, when the number of times the internal combustion engine is driven is larger than a predetermined number of times, invalidate the calculated electric power consumption rate or the information acquired to calculate the electric power consumption rate.

8. The plug-in hybrid vehicle according to claim 1, wherein the vehicle is able to travel in a first drive mode in which the vehicle preferentially travels with the use of only the electric motor as the driving force source and in a second drive mode in which the vehicle preferentially travels with the use of both the electric motor and the internal combustion engine as the driving force source, and the controller is confirmed to learn the electric power consumption rate by incorporating an electric power consumption rate calculated on the basis of an electric power consumption and a travel distance in a period during which the vehicle has traveled with the use of only the electric motor as the driving force source in the first drive mode.

9. The plug-in hybrid vehicle according to claim 8, wherein the controller is configured to cause the vehicle to travel in the first drive mode when an amount of electric power stored in the electrical storage device is larger than or equal to a predetermined amount and to cause the vehicle to travel in the second drive mode when the amount of electric power stored in the electrical storage device is smaller than the predetermined value.

* * * * *